United States Patent
Martin et al.

(10) Patent No.: US 11,027,246 B2
(45) Date of Patent: Jun. 8, 2021

(54) CLOSED CONCENTRATED DRY CHEMICAL DISPERSION SYSTEM AND METHOD

(71) Applicant: FMC Corporation, Philadelphia, PA (US)

(72) Inventors: Timothy M. Martin, Ringoes, NJ (US); Richard G. Ekins, Coatesville, PA (US)

(73) Assignee: FMC Corporation, Philadelphia, PA (US)

( * ) Notice: Subject to any disclaimer, the term of this patent is extended or adjusted under 35 U.S.C. 154(b) by 666 days.

(21) Appl. No.: 15/700,353

(22) Filed: Sep. 11, 2017

(65) Prior Publication Data

US 2018/0071697 A1    Mar. 15, 2018

Related U.S. Application Data

(60) Provisional application No. 62/385,272, filed on Sep. 9, 2016.

(51) Int. Cl.

| | |
|---|---|
| *B01F 5/04* | (2006.01) |
| *A01M 21/04* | (2006.01) |
| *A01C 23/04* | (2006.01) |
| *A01M 7/00* | (2006.01) |
| *B01F 13/00* | (2006.01) |
| *B01F 3/06* | (2006.01) |
| *B05B 7/14* | (2006.01) |
| *A01N 25/04* | (2006.01) |
| *G05D 7/01* | (2006.01) |

(52) U.S. Cl.
CPC .......... *B01F 5/0403* (2013.01); *A01C 23/042* (2013.01); *A01M 7/0092* (2013.01); *A01M 21/043* (2013.01); *B01F 3/06* (2013.01); *B01F 13/0035* (2013.01); *B05B 7/1459* (2013.01); *A01N 25/04* (2013.01); *G05D 7/0173* (2013.01)

(58) Field of Classification Search
CPC . A01C 23/042; A01M 21/043; A01M 7/0092; A01N 25/04; B01F 3/06; B01F 5/0403; B01F 13/0016; B01F 13/0035; B05B 7/1459

See application file for complete search history.

(56) References Cited

U.S. PATENT DOCUMENTS

| | | |
|---|---|---|
| 3,165,114 A | 1/1965 | Garrett |
| 4,550,653 A * | 11/1985 | Hedenberg ............... A21B 1/22 99/348 |
| 4,638,926 A | 1/1987 | Brock |
| | (Continued) | |

FOREIGN PATENT DOCUMENTS

| | | |
|---|---|---|
| EP | 1891849 A1 | 2/2008 |
| WO | 2015/048757 A2 | 4/2015 |

*Primary Examiner* — Tony G Soohoo
(74) *Attorney, Agent, or Firm* — Fox Rothschild LLP

(57) ABSTRACT

A closed concentrated dry chemical dispersion system including a closed ingredient container having a volume of dry ingredient therein. The system provides a fluid container and a mixing chamber in which the dry ingredient and fluid can be mixed to form a formulation for delivery to a device such as agrochemical dispensing equipment. The system minimizes worker exposure to the chemicals and enables lower packaging and transportation costs.

26 Claims, 7 Drawing Sheets

(56) References Cited

U.S. PATENT DOCUMENTS

| | | | | |
|---|---|---|---|---|
| 5,222,807 | A | * | 6/1993 | Gaddis ................... B01F 1/00 210/408 |
| 5,369,032 | A | * | 11/1994 | Pratt .................. A01K 5/0216 222/58 |
| 5,580,168 | A | * | 12/1996 | Alireza ............... A01M 7/0092 366/153.1 |
| 5,816,502 | A | | 10/1998 | Sperry et al. |
| 6,425,529 | B1 | * | 7/2002 | Reinsch ............. A01M 7/0092 239/10 |
| 7,147,361 | B2 | * | 12/2006 | Cecala ................ A01C 23/042 366/132 |
| 7,370,589 | B2 | | 5/2008 | Wilkerson et al. |
| 2003/0226857 | A1 | * | 12/2003 | Bibbo .................... A61L 2/208 222/148 |
| 2004/0008571 | A1 | * | 1/2004 | Goody ................... C09K 8/68 366/154.1 |
| 2013/0258799 | A1 | * | 10/2013 | Christy .................. B01F 7/22 366/141 |
| 2015/0093426 | A1 | | 4/2015 | Martin et al. |

* cited by examiner

CLOSED CONCENTRATED DRY CHEMICAL DISPERSION SYSTEM AND METHOD

CROSS REFERENCE TO RELATED APPLICATION

This application claims the benefit of U.S. provisional patent application Ser. No. 62/385,272, filed on 9 Sep. 2016, and is related to International application number PCT/US17/50611, filed on 8 Sep. 2017, both of which applications are incorporated herein by reference in their entirety.

FIELD OF THE INVENTION

The present invention relates to systems and methods for formulating and applying agrochemical compositions and formulations.

BACKGROUND OF THE INVENTION

U.S. patent application Ser. No. 14/502,251, which is incorporated herein by reference, discloses a dispersion (delivery) system utilizing new techniques for formulating and applying agricultural active ingredients such as insecticides, herbicides, fungicides, pesticides, fertilizers, and plant nutrients. The delivery system reduces the volume of agricultural formulation needed to treat a particular area of a field, allows for more precise delivery of an agricultural formulation to the area where it can be most effective, and increases the efficacy of a given volume of an agricultural formulation. The delivery system meets the needs for ultra-low-volume, high-precision application of agricultural active ingredients by providing a formulation capable of being foamed and applied in-furrow during planting. Such high precision, ultra-low-volume application techniques allow greater coverage of areas while using lower amounts of active ingredient and lower volumes of water.

The delivery system utilizes dry chemical ingredients, e.g. active ingredients, foaming agents and like. The dry ingredients are typically in the form of concentrated powders or weakly granulated dense solids that are mixed with water, or another desired fluid medium, on the planting tractor or equipment. Such a system allows for water and active ingredients to remain separated until just prior to delivery and for the use of precise amounts of chemical ingredients and water without the need to carry excessive extra weight.

While the described delivery system has benefits, it can be difficult to mix the components on the delivery equipment. For example, the dry ingredients and the water may be delivered separately and mixed through injection mixing. Such a system, however, requires metering of the dry ingredients, which is often difficult to accomplish accurately. As another alternative, the dry ingredients and water may be poured into a mixing tank and mixed via internal agitators and/or a recycled spray within the tank. Pouring of the dry ingredients into the tank can cause the release of dust or the like which may be harmful to the operator and may cause inaccuracies.

Accordingly, there is a need for a system that facilitates easy and accurate mixing of a desired amount of dry ingredient and fluid medium.

SUMMARY OF THE INVENTION

In broad terms, the present invention provides a concentrated chemical dispersion system and method that disperses a concentrated ingredient in a fluid medium that will be dispensed. The system includes an ingredient container defining an internal chamber having a volume of a concentrated ingredient therein. The ingredient container is configured to be stored separately from the system in a closed condition to seal the ingredient therein, and is further configured to be connectable to the system and opened for transferring the ingredient to the system. The system further includes a fluid container for holding a fluid medium within. The system also includes a mixing chamber for dispersing or mixing the ingredient and the fluid medium, and which is configured to be in fluid communication with the fluid container for receiving the fluid medium therefrom at least when the ingredient container is coupled to the system. The mixing chamber is configured to contain the ingredient therein at least when the ingredient container is coupled to the system. An agitator is disposed for mixing the ingredient and the fluid medium in the mixing chamber into a formulation. A downstream fluid conduit is in communication with equipment that dispenses the formulation. The mixing chamber is in fluid communication with the downstream fluid conduit at least when the ingredient container is coupled to the system for transferring the formulation to the equipment.

In one embodiment, the ingredient container includes the mixing chamber. This can be provided with an ingredient container having an internal chamber that includes the mixing chamber, and which has an internal volume greater that the volume of the ingredient therein to allow the addition of the fluid to be mixed therein for forming the formulation. This embodiment can include a flexible ingredient container that allows the use of an agitator that can engage and deform the flexible container to mix the ingredient and fluid within, although a non-flexible ingredient container can be used as well as other types of agitators. Here, the mixing chamber, included with the ingredient container, is in fluid communication with the fluid container and downstream fluid conduit when the ingredient container is coupled to the system.

In another form, the present invention provides a system where the mixing chamber is separate from the internal chamber of the ingredient container. This can be provided by a mixing chamber formed as a separate container that is independent from the ingredient container. Here, the mixing chamber, being separate from the ingredient chamber, receives the ingredient from the ingredient container after the ingredient container is coupled to the system.

In yet another embodiment, the present invention provides a system for handling the ingredients from multiple containers, which can be mixed and dispersed in a combined dispersion or separately.

The invention also provides a method for dispersing a concentrated chemical. In one embodiment, the method includes: (a) providing an ingredient container defining an internal chamber and having a volume of a dry ingredient therein, the ingredient container configured to be in a closed condition to seal the ingredient therein during storage and handling of the ingredient container; (b) coupling the ingredient container to a dispersion system to be included therein such that the internal chamber is in fluid communication therewith, the dispersion system further including a fluid medium and a downstream fluid conduit, the downstream fluid conduit being in fluid communication with dispensing equipment; (c) mixing the ingredient and the fluid medium within the dispersion system; (d) agitating the mixed ingredient and the fluid medium within the dispersion system to form a formulation; and (e) transferring the formulation to the downstream fluid conduit for dispensing the formulation.

In one form, the fluid medium is provided in a fluid container, and the ingredient container is in fluid communication with the fluid container and the downstream fluid conduit when the ingredient container is coupled to the dispersion system.

In yet another embodiment, step (c) of the above method is carried out in a mixing chamber which is in fluid communication with the downstream fluid conduit when the ingredient container is coupled to the dispersion system. In one form the internal chamber of the ingredient container includes the mixing chamber while in another form the mixing chamber is separate from the internal chamber.

Other features and embodiments are provided as further discussed below.

BRIEF DESCRIPTION OF THE DRAWINGS

The accompanying drawings, which are incorporated herein and constitute part of this specification, illustrate presently preferred embodiments of the invention and, together with the general description given above and the detailed description given below, serve to explain the features of the invention. In the drawings.

DETAILED DESCRIPTION OF THE INVENTION

Figure 1:
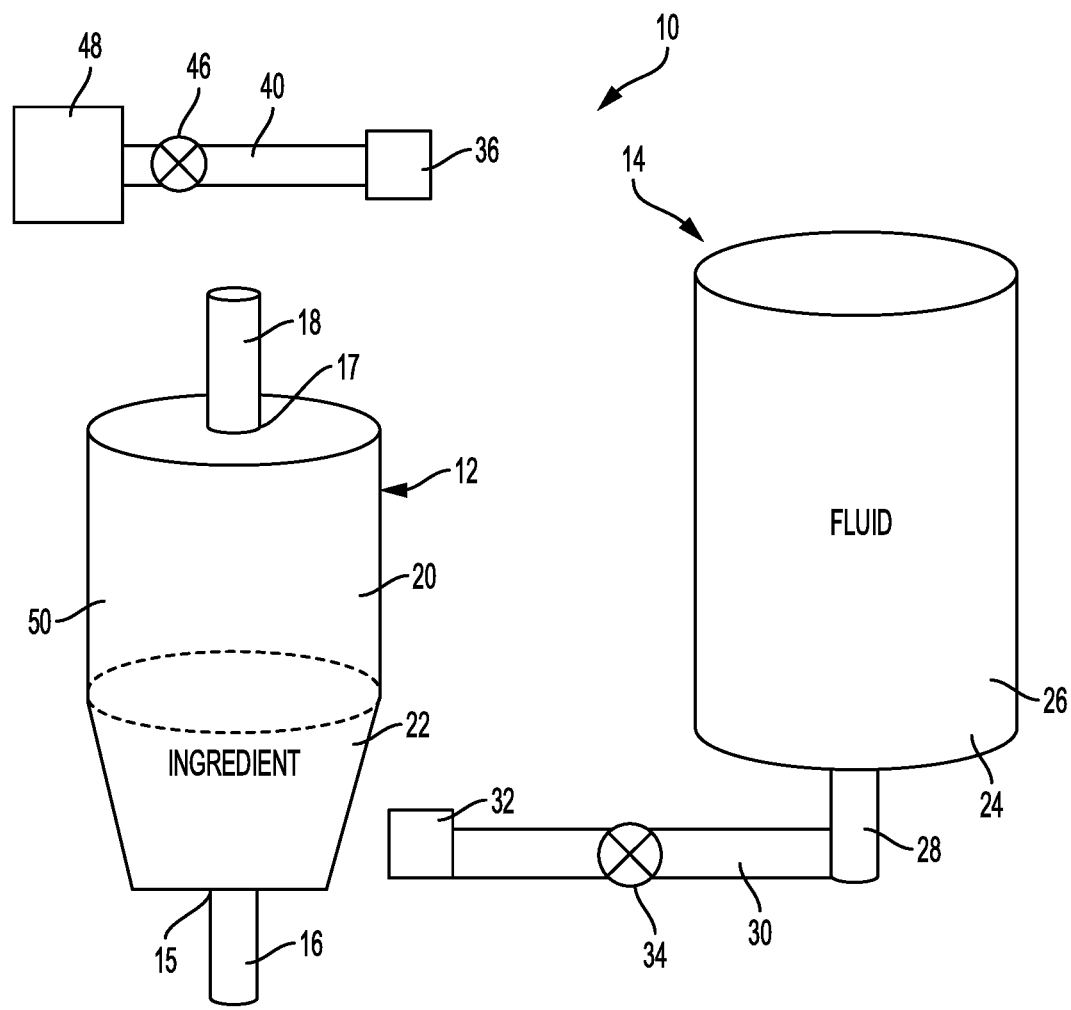
FIG. 1 is a schematic view illustrating a closed concentrated dry chemical dispersion system in accordance with an embodiment of the invention with the closed ingredient container separate from and not yet coupled to the fluid medium container and the downstream conduit associated with the rest of the system.

In the drawings, like numerals indicate like elements throughout. Certain terminology is used herein for convenience only and is not to be taken as a limitation on the present invention. The following describes preferred embodiments of the present invention. It should be understood, however, that based on this disclosure, the invention is not limited by the preferred embodiments described herein.

Referring to FIGS. 1-5, an exemplary closed concentrated dry chemical dispersion system 10 in accordance with an embodiment of the invention will be described. An exemplary method for dispersing the concentrated chemical is also described. As used herein, "dry ingredient" refers to concentrated powders, particles, granulated dense solids, pellets or any other concentrated ingredients and chemicals that are to be mixed with water or other fluid medium to create the desired formulation to be dispensed by the system. Notable dry ingredients comprise an agricultural agent and optionally at least one adjuvant. The dry ingredient is desirably easily transferred from a first part of the system to a second part of the system when the system is operated. The terms "communication" and "fluid communication" as used herein refer to any connection between a first part or section of the system 10 to a second part or section of the system 10, and optionally to additional parts or sections of the system 10, via which the dry ingredient(s), fluid medium, formulations and similar materials can flow or travel from the first part of the system to the second part of the system and/or additional parts or sections of the system. Such fluid communication is typically provided by conduits, piping systems, hoses, tubing or other devices well known to persons of ordinary skill in the art.

As used herein, the terms "disperse", "dispersing", "dispersion" and related terms refer to mixing the dry ingredient with a liquid ingredient, so that it is diluted into a liquid formulation. The dry ingredient may be dispersed in the form of finely divided particles suspended in the liquid, or the solid may be dispersed in a colloid, emulsion, or solution.

The terms "dispense", "dispensing", and related terms refer to delivery of the dispersion of the dry ingredient in the liquid ingredient from the system for distribution to its intended location, for example to a seed, soil or the furrow during planting, or to foliar parts of a plant after emergence. Dispensing equipment can include pumps, valves, conduits, nozzles, applicators, foaming apparatus and/or other devices for delivery of the dispersion from the system. Dispensing equipment may also include vehicles such as tractors, planters and the like that transport the system to, from and around the agricultural field where the dispersion is to be delivered.

The system 10 generally comprises a closed dry ingredient container 12 and a fluid container 14. In the current illustrated embodiment, the dry ingredient container 12 is a flexible container, for example, a flexible pouch having an inlet 15 with an inlet fitting 16 and an outlet 17 with an outlet fitting 18, which are initially closed or sealed. An internal chamber 20 is defined within the container 12 and is prefilled with a desired amount of dry ingredient 22. The fittings 16, 18 remain closed until the container 12 is connected to the system 10. In this manner, the dry ingredient container 12 is a pre-filled, closed container that is ready for use simply by connecting to the dispersion system 10. The fittings can be any suitable means or devices for closing, sealing and/or opening the inlet 15 and outlet 17 into the container 12. FIG. 1 illustrates fittings 16, 18 as configured on opposed ends of the container 12. However, other configurations are contemplated, such as embodiments wherein the fittings 16, 18 are configured adjacent to each other on one end of the container 12. Prior to connection, the container 12 may be moved and transported without worry of loss of material exposure or harm to an operator.

As illustrated in FIG. 1, the internal chamber 20 for this embodiment has a volume that is greater than the volume of the dry ingredient 22 to accommodate a predetermined or sufficient amount of water or other fluid medium 26 to be added into the chamber 20. In this embodiment the internal chamber 20, with its larger volume for receiving and holding the fluid 26, also forms a mixing chamber 50 in which the fluid 26 is mixed with the dry ingredient 22 to create the intended formulation 44, as is further described below.

Figure 2:
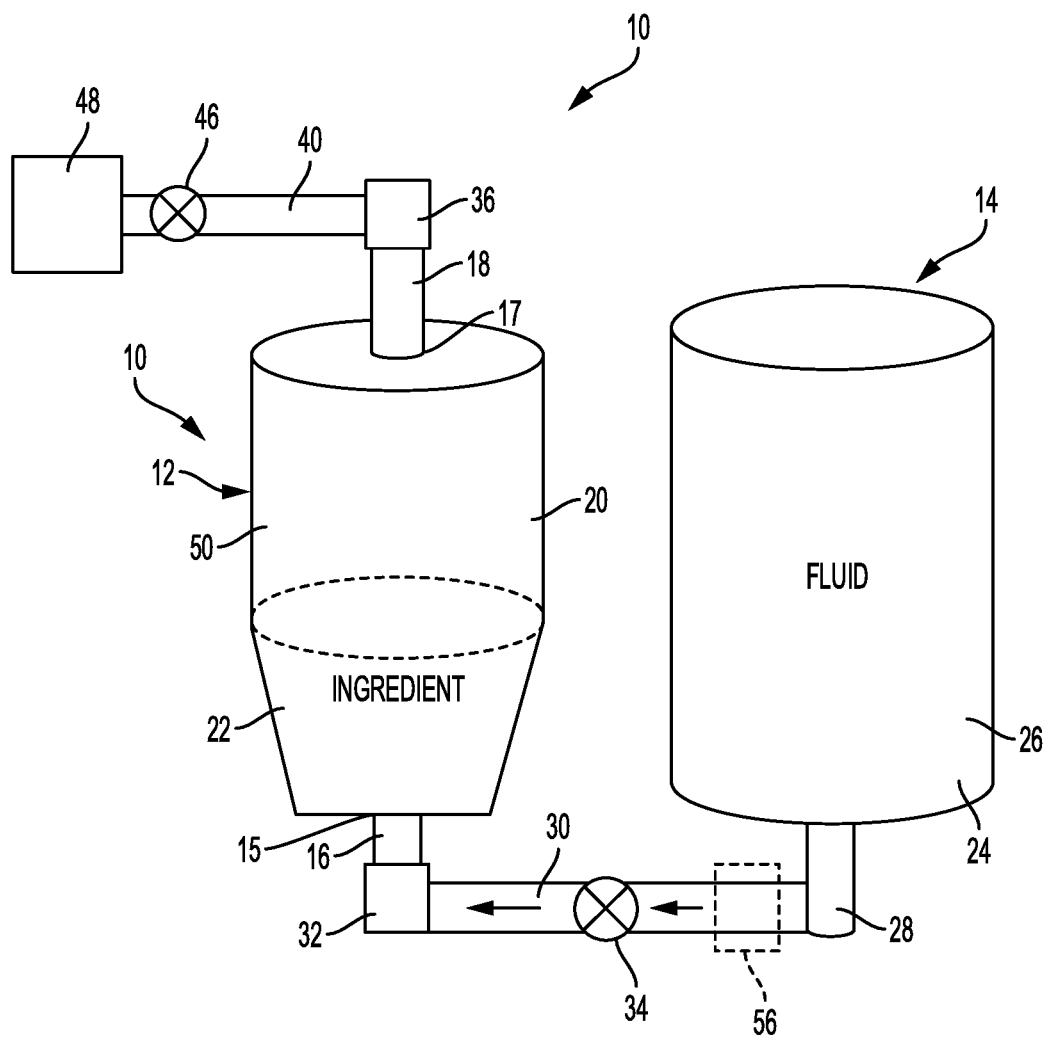
FIG. 2 is a schematic view illustrating the closed concentrated dry chemical dispersion system of FIG. 1 with the ingredient container connected to and in fluid communication with the fluid container and the downstream conduit.

The fluid container 14 is preferably in the form of a tank with an internal volume 24 which stores a fluid medium 26 such as water and which may include additional liquid components. The container 14 has an outlet 28 that connects to a fluid delivery conduit 30, such as a piping or tubing, which terminates in a fluid lock fitting 32. A control valve 34 is provided along the fluid delivery conduit 30 to meter the amount of fluid 26 delivered through the lock fitting lock 32 and into the dry ingredient container 12. Alternatively, or additionally, the fluid delivery conduit 30 may include a pump 56 (see FIG. 2) to facilitate delivery of the fluid through the fluid delivery conduit 30. The lock fitting 32 is configured to receive and connect to the inlet fitting 18 of the dry ingredient container 12 and to establish fluid communication between the delivery conduit 30 and container internal chamber 20 as illustrated in FIG. 2. A second fluid lock fitting 36 is configured to receive the outlet fitting 16 of the dry ingredient container 12 and to establish fluid communication between the container internal chamber 20 and downstream conduit 40, such as pipe or tubing. The downstream conduit 40 may lead, for example, to dispensing equipment 48, which can include nozzles, applicators, foaming apparatus and/or other equipment for delivery of the dispersion from the system. For example, the downstream conduit 40 may be the main line 108 as described in U.S. patent application Ser. No. 14/502,251. While the system 10 is described herein as used with the delivery system of U.S. patent application Ser. No. 14/502,251, the invention is not limited to such and the system 10 may be used in other applications. The fittings 16, 18 and the lock fittings 32, 36 may have various configurations, for example, screw fittings, snap fittings and the like, and can include valves and other type fittings that allow a sealed fluid connection of the container 12 to the conduits 30 and 40 while maintaining the closed system, i.e., presenting leakage and exposure of the ingredient 22. Put another way, coupling the ingredient container 12 to the conduits 30 and 40 via the fittings 16, 18 and the lock fittings 32, 36 provides for sealed fluid communication between the ingredient container 12 with the relevant components of the dispersion system 10 to maintain the closed system.

Figure 3:
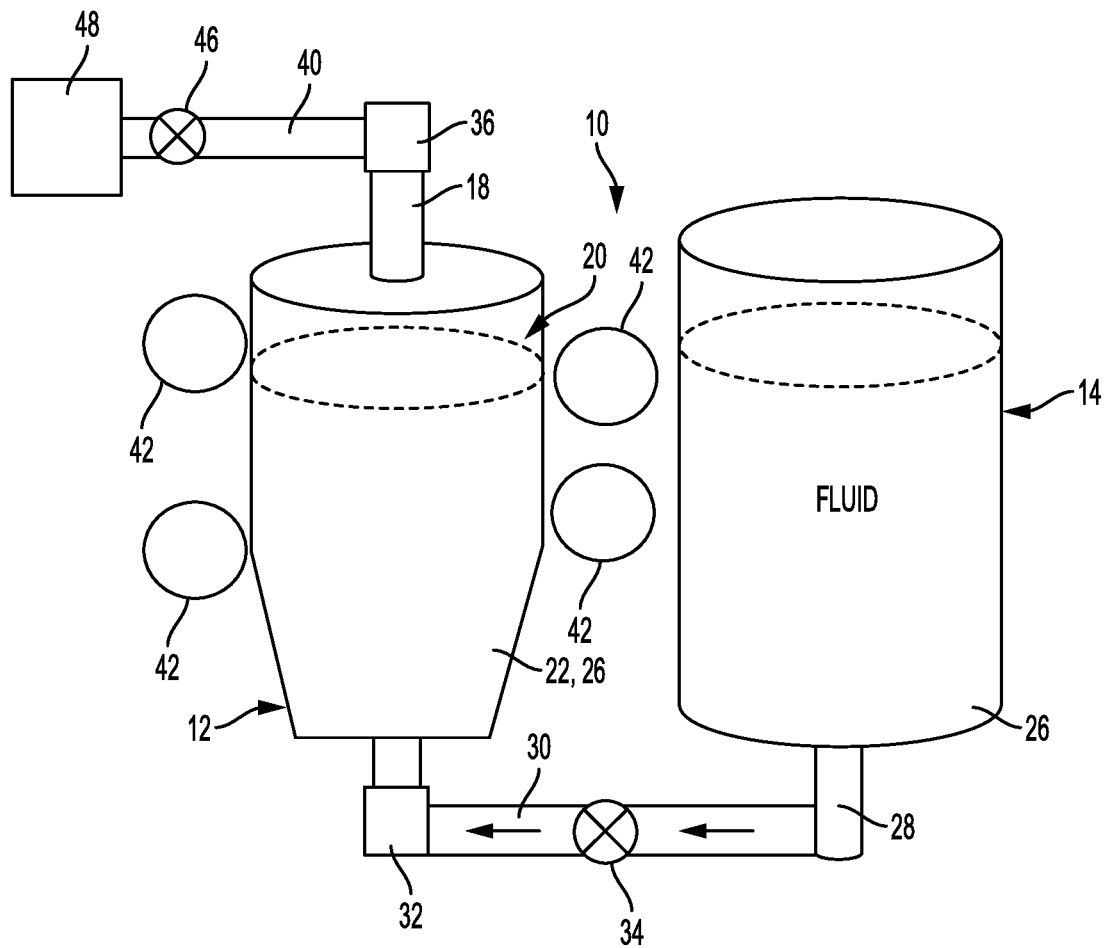
FIG. 3 is a schematic view illustrating the closed concentrated dry chemical dispersion system of FIG. 1 with fluid from the fluid medium container having been added to the ingredient container.
Figure 4:
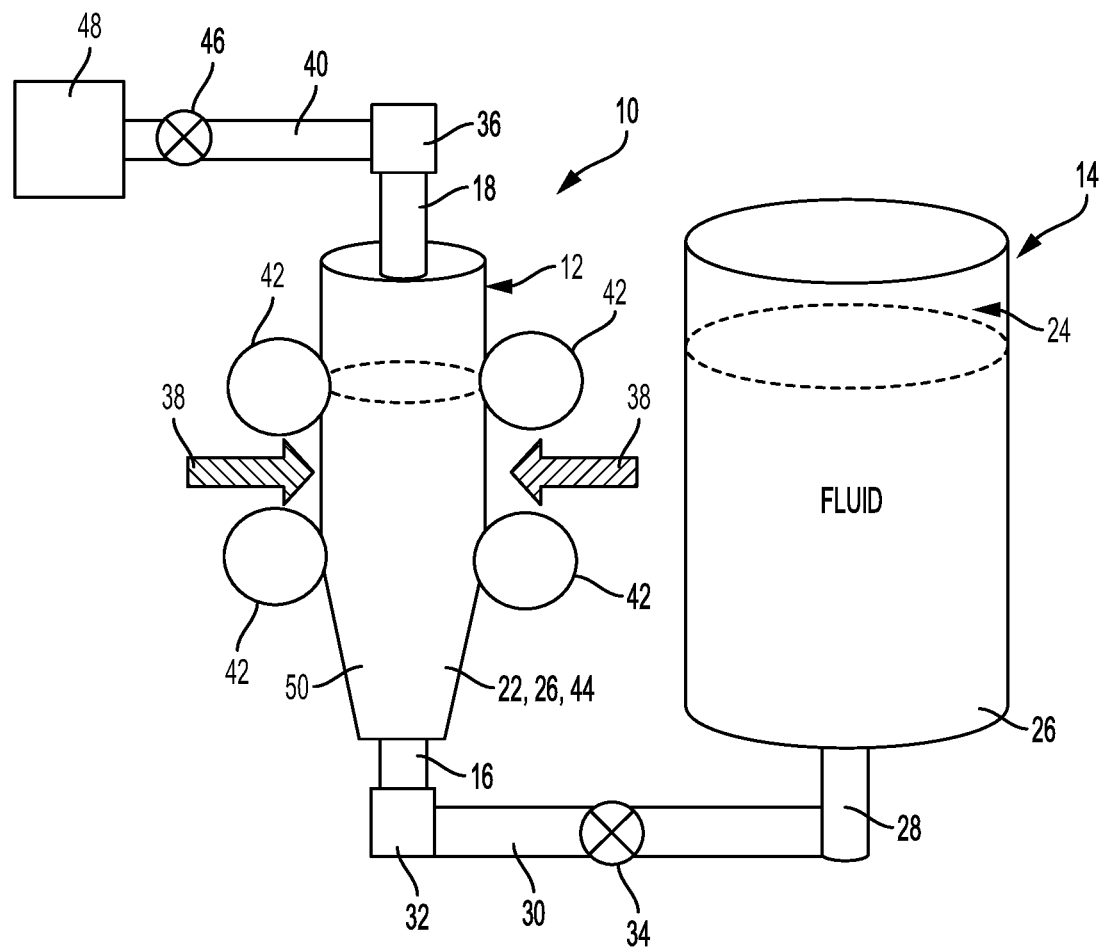
FIG. 4 is a schematic view of the closed concentrated dry chemical dispersion system of FIG. 1 illustrating external agitators mixing the fluid medium and the ingredients within the ingredient container.

Once the dry ingredient container 12 is secured within the lock fittings 32, 36, the control valve 34 is opened to facilitate the flow of fluid 26 into the chamber 20 as illustrated in FIG. 3, and closed once the desired amount is added. The valve 34 can be configured to easily meter the fluid 26, which is much easier than metering the dry ingredient 22 such as a dry powder or granulated solid. Thus, it is seen that the mixing chamber 50 is capable of fluid communication with the fluid container 14 to receive fluid 26 therefrom at least when the ingredient container 12 is coupled to the rest of the system 10. In the configuration of this particular embodiment, however, in which the internal chamber 20 of the ingredient container 12 includes the mixing chamber 50, this fluid communication is possible only once the ingredient container 12 is coupled to the rest of the system 10.

To ensure proper mixing of the dry ingredients 22 and the fluid 26, agitators 42, such as the rollers illustrated to be external of the container 12, are provided. The rollers 42 are actuated to move back and forth against the flexible container 12 as illustrated by the arrows 38 in FIG. 4 to mix the dry ingredients 22 and fluid 26 to form a formulation 44 within the mixing chamber 50/internal chamber 20. The flexible container 12 in this embodiment has walls sufficiently deformable to allow such mixing. The rollers 42 may be fluid actuated utilizing air or hydraulic fluid already on the dispensing equipment 48, for example, the compressors 130, 132 in U.S. patent application Ser. No. 14/502,251. Alternatively, the rollers 42 may be actuated by an independent fluid source or may be actuated by some other mechanical or electrical means. Other forms of agitators 42, including mechanical, e.g., paddle mixers, and vibratory, can be used. It is understood that other forms of agitators, such as vibratory, may not require a flexible container 12.

Figure 5:
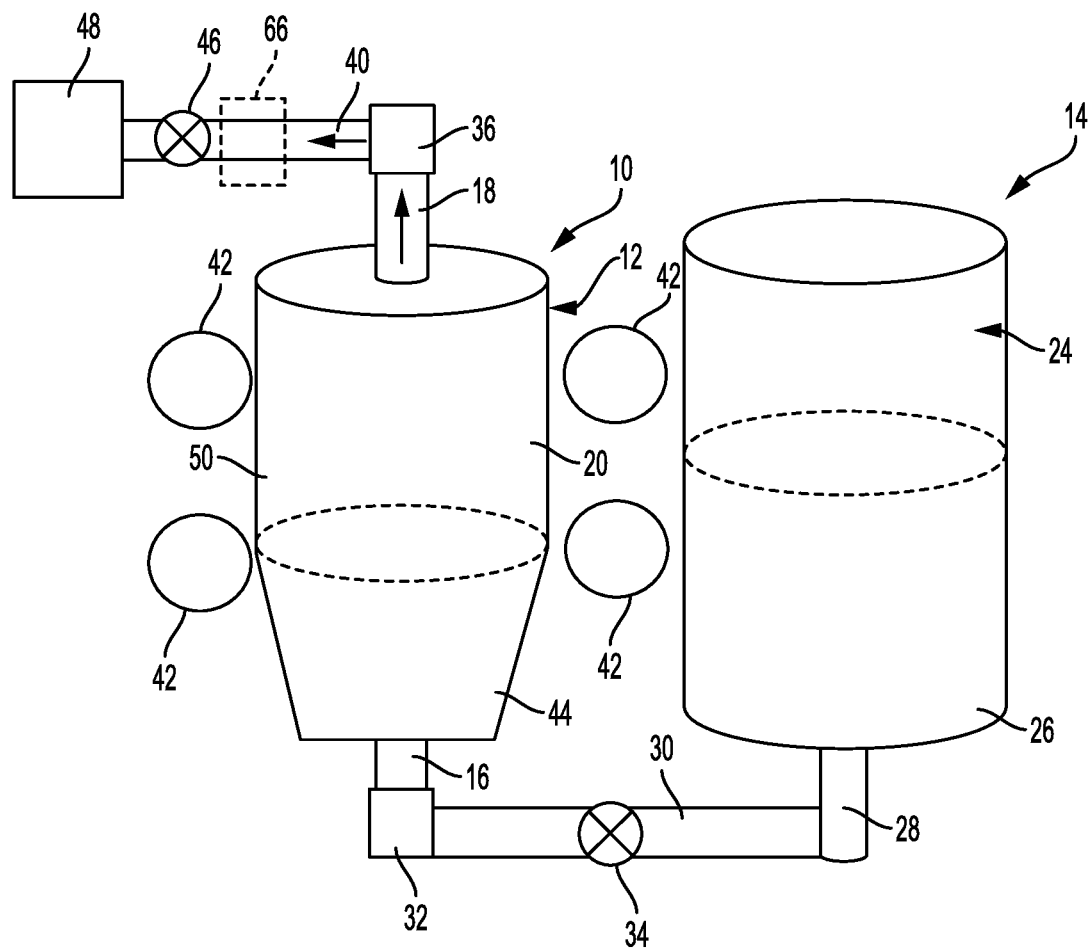
FIG. 5 is a schematic view of the closed concentrated dry chemical dispersion system of FIG. 1 illustrating the mixed formulation within the dry ingredient container and being delivered to the equipment for disbursing the formulation.

Once mixing has been completed, the formulation 44 (the mixed ingredient 22 and fluid 26) within the mixing chamber 50/internal chamber 20 is ready for delivery along the downstream piping 40 as illustrated in FIG. 5. A control valve 46 may be positioned along the conduit 40 to prevent flow therethrough until mixing is complete. A pump 66 (see FIG. 5) may be used to facilitate flow of the formulation through the downstream piping 40. It is appreciated that in the configuration of this embodiment, the mixing chamber 50, being included with the internal chamber 20 of the ingredient container 12, is capable of being in fluid communication with the downstream fluid conduit 40 only once the ingredient container is coupled to the rest of the system 10.

The system 10 described herein allows the provision of an accurate amount of dry ingredients 22 in a closed container 12 and precise mixing with a desired amount of water or fluid 26. In one example, the flexible container 12 may be sized at 30×14×14 inches (76.2×35.6×35.6 cm) or 25.5 gallons (96.5 liters) such that it holds 50 lbs (22.7 kg) or 12.5 gal. volume (47.3 liters) of a 75% dry ingredient formula (75% active ingredient, 25% inert ingredients to make up 100% of the formulation of a dry chemical concentrate) and can receive 12 gallons (45.4 liters) of water (2 lbs. (0.9 kg) of water/1 lb. (0.45 kg) of formula). Assuming 0.1 lbs. (0.045 kg) of dry ingredient formula is necessary for each acre; the relatively small 25 gallon (94.6 liters) container would provide enough formulation to cover 375 acres while adding only a load of 150 lbs. (68 kg) to the dispensing equipment 48.

Figure 6:
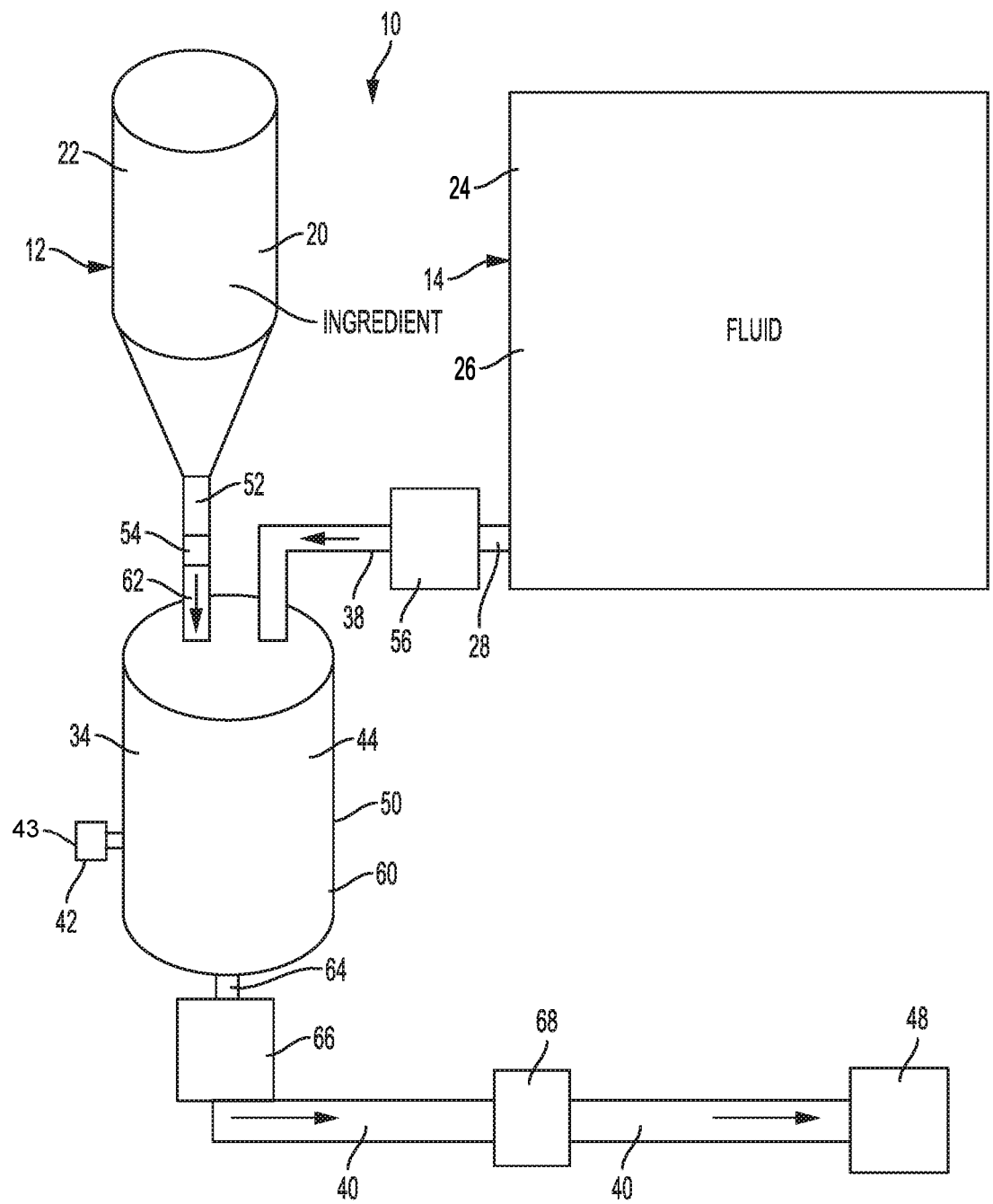
FIG. 6 is a schematic view illustrating a closed concentrated dry chemical dispersion system in accordance with a second embodiment of the invention.

Referring to FIG. 6, an exemplary closed concentrated dry dispersion system 10 in accordance with a second embodiment of the invention is now described. Similar to that described above, here the system 10 generally comprises a closed dry concentrated ingredient container 12 and a fluid container 24, but with a mixing chamber 50 that is separate from the ingredient container 12.

In this embodiment as illustrated, the dry ingredient container 12 is formed as a non-flexible container, although flexible containers may be used. The ingredient container 12 has an internal chamber 20 and preferably includes an outlet 52 having a fluid lock fitting 54 which is initially closed or sealed. The internal chamber 20 of the ingredient container 12 is prefilled with a desired amount of dry ingredient 22. The fitting 54 remains closed, or the container 12 otherwise remains sealed closed, until the container 12 is connected to the system 10 as described below. In this manner, as with the above-described embodiment, the dry ingredient container 12 is a pre-filled, closed container that is ready for use simply by connecting to the system 10. Prior to connection, the container 12 may be moved and transported without worry of loss of ingredient 22 or potential harm to an operator. Furthermore, in this embodiment, the internal chamber 20 of the ingredient container 12 need not have a volume that is significantly greater than the volume of the dry ingredients 22 therein since the ingredient 22 is mixed with the fluid medium 26 in a separate mixing chamber 50 as described below.

As noted above, fluid medium 26, e.g., water, is to be added and mixed with the dry ingredient 22 to create the intended formulation 44. As with the previously described embodiment, the fluid container 14 is preferably in the form of a tank with an internal volume 24 which stores the fluid medium 26. The container 14 has a fluid outlet 28 which, in this embodiment, connects to fluid pump 56, which fluidly communicates with the mixing chamber 50 through fluid delivery conduit 58 such as the piping as illustrated. The fluid pump 56 can be controlled to deliver the desired amount of fluid 26 to the mixing chamber 50, or a control or metering valve can be used as in the prior described embodiment.

The mixing chamber 50 is preferably in the form of a tank 60 suitable for mixing the ingredient 22 and fluid medium 26 into the formulation 44. The mixing chamber 50 is in fluid communication with the fluid container 14 for receiving fluid 26 therefrom. As noted, a fluid pump 56, or a control or metering valve 34 (not shown), can be used to control the amount of fluid 26 added to the mixing chamber 50.

The ingredient container 12 is placed in communication with the mixing chamber 50 so that the ingredient 22 can be transferred into the mixing chamber 50. An inlet fitting 62 for connecting to the lock fitting 54, or some other suitable means of connecting the ingredient container 12 to the mixing chamber 50 and opening the ingredient container 12 to allow the ingredient 22 into the mixing chamber 50 can be used.

The mixing chamber 50 includes an agitation device 42 to mix the ingredient 22 and the fluid 26, such as a mechanical (e.g., rotating paddles), vibratory, or other type of agitation means. A mixing chamber outlet 64 leading to downstream conduit 40 is shown, which leads to the dispensing equipment 48. The downstream piping 40 may be, for example, the main line 108 as described in U.S. patent application Ser. No. 14/502,251. A pump 66 and flow meter 68 for controlling the flow of the formulation 44 is shown. Again, while the system 10 is described herein for use with the delivery system of U.S. patent application Ser. No. 14/502,251, the invention is not limited to such and the system 10 may be used in other applications. The fittings and the lock fittings may have various configurations, for example, screw fittings, snap fittings and the like.

In use, the prefilled and sealed ingredient container 12 is secured to the system 10 to be in fluid communication with the mixing chamber 50 so that the ingredient 22 within can be transferred into the mixing chamber 50. Preferably, the full amount of ingredient 22 in the container 12 is transferred into the mixing changer 50. Fluid 26, such as water, from the fluid container 20, is directed into the mixing chamber 50 via use of the water pump 56 and/or the control of suitable valves, the flow of fluid 26 being stopped once the desired amount is added. The pump 56, or a valve as used in the prior described embodiment, can be configured to easily meter the fluid medium 26, which is easier than metering a dry powder or granulated solid ingredient 22.

The ingredient 22 and fluid medium 26 are mixed in the mixing chamber 50 by the agitation means 42 provided, which can be a vibratory device 43 as shown schematically. It is appreciated that a control system including a microprocessor or other known means can be used to control the pumps, valves, control devices, and agitators of the system 10.

Once mixing is completed, the formulation 44 within the mixing chamber 50 is ready for delivery along the downstream piping 40.

The present invention, as described above, can deliver an accurate amount of highly concentrated ingredients 22 in ULV (ultra low volume) delivery systems without complex metering systems. For example, it can deliver water-based compounds that may not be stable in water such as biological agents. The closed containers 12 of ingredient 22, which attach to the closed system 10 for mixing, minimize worker contact with the chemicals. The sealed containers 12 of ingredients 22 also enable lower packaging and transportation costs. The current invention also allows the dilution and application of the ingredients 22 prescriptively and in real time during planting operation.

It is further appreciated that the system of the current invention can work with multiple ingredient containers 12 where each container can contain a different ingredient 22, and where the multiple ingredients 22 can be dispersed simultaneously or separately. An example of such an embodiment where the multiple ingredients 22 can be dispersed simultaneously is described with reference to FIG. 7.

Figure 7:
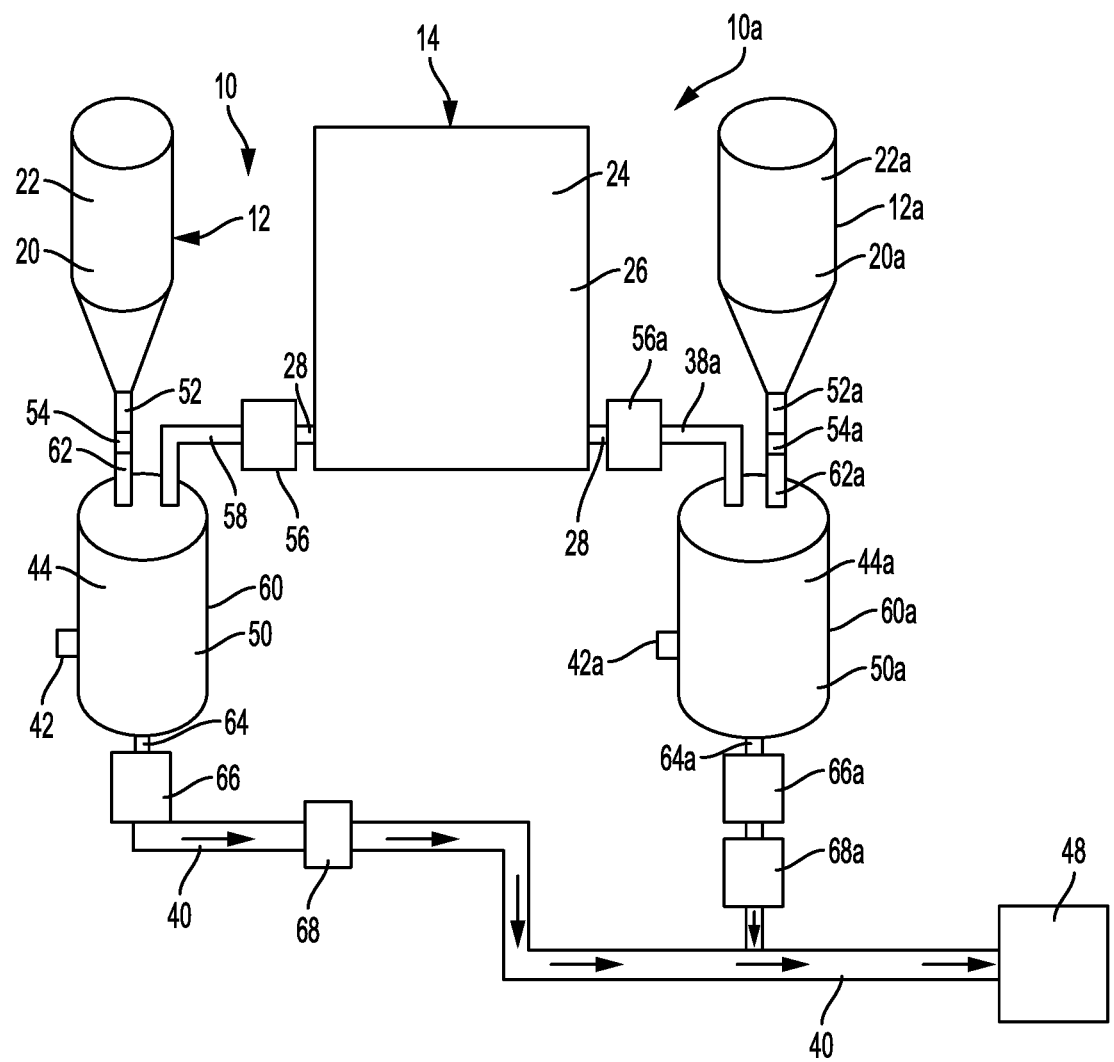
FIG. 7 is a schematic view illustrating a closed concentrated dry chemical dispersion system in accordance with a third embodiment of the invention that can dispense ingredients from multiple ingredient containers simultaneously in a combined mixture.

FIG. 7 shows the same system 10 as shown in FIG. 6, and a second similar system 10a for receiving a second ingredient container 12a containing a second ingredient 22a. The second system 10a has similar elements and components as that of system 10 which are identified with the same reference numbers but with an added "a", e.g., the first ingredient container is referenced as "12" and the second ingredient container is referenced as "12a". As seen, fluid medium 26 to be mixed with ingredient 22a can be provided from the same fluid container 14, but separate fluid containers could be used. The ingredient 22a is added to the second mixing chamber 50a, where it is mixed with fluid 26 to form a second formulation 44a as described above with reference to system 10 in FIG. 6, and then provided to dispensing equipment 48, such as comprising a foaming apparatus, via common downstream conduit 40. Here the common downstream conduit 40 feeds the combined mixtures 44, 44a of systems 10 and 10a to a single dispensing device 48 to be delivered simultaneously. Other configurations can be used, such as a second or separate downstream fluid conduit 40a feeding into a common dispensing device 48 such as a common foaming device, or even separate dispensing devices, each of which may independently comprise foaming devices or non-foaming dispensing devices.

Another variant comprises a configuration wherein multiple containers 12 and 12a containing multiple ingredients 22 and 22a are placed in communication with a single mixing chamber 50 via fittings 52, 52a, 54, 54a, and conduits 62 and 62a, providing for easy mixing of different concentrated ingredients in a single mixing chamber.

The dispersion (delivery) system described herein is particularly useful for delivery of an agricultural agent to seeds, plants or the soil surrounding the seed or plant in an agricultural field. The delivery system reduces the volume of agricultural formulation needed to treat a particular area of a field, allows for more precise delivery of an agricultural formulation to the area where it can be most effective, and increases the efficacy of a given volume of an agricultural formulation. The delivery system meets the needs for ultra-low-volume, high-precision application of agricultural active ingredients by providing a formulation capable of being foamed and applied in-furrow during planting. Such high precision, ultra-low-volume application techniques allow greater coverage of areas while using lower amounts of active ingredient and lower volumes of water.

The system provides for dispersing a concentrated dry ingredient in a liquid for delivery. The dry concentrated ingredient may comprise an agricultural agent and at least one adjuvant.

The terms "agricultural agent" and "active ingredient" means a bioactive agent used in agriculture, such as an herbicide, pesticide, insecticide, fungicide, nematicide, fertilizer or plant nutrient, or any combination thereof. "Agricultural agent" may also comprise a biological agent such as a microbial strain (for example, a *Bacillus* strain) in spore or vegetative cell form that provides a plant benefit or control of a pest or pathogen. "Bioactive agent" means a substance such as a chemical that can act on a cell, virus, organ or organism, including but not limited to insecticides, fungicides, nematicides and herbicides, which substance creates a change in the functioning of the cell, virus, organ or organism.

Adjuvants are ingredients in the concentrated composition that are biologically inert but facilitate formulation or handling of the active ingredient. Adjuvants that may be included in the concentrated ingredient include carriers, surface active agents, viscosity modifiers, thickeners, preservatives, biocides or biostatic agents, suspending agents, crystallization inhibitors, colorants, dyes, anti-oxidants, foaming agents, foam stabilizers, light absorbers, mixing auxiliaries, antifoams, complexing agents, neutralizing or pH-modifying substances and buffers, corrosion inhibitors, fragrances, wetting agents, take-up enhancers, micronutrients, plasticizers, glidants, lubricants, dispersants, or any combination thereof.

The concentrated compositions may comprise active ingredients in amounts from a lower limit of about 5, about 10, about 20, about 25, about 50, about 60 or about 70 weight % to an upper limit of about 80, about 90, about 95 or about 99 weight %, with one or more adjuvants comprising complementary amounts of the concentrated compositions. For example, a concentrated composition may comprise from about 70 to about 80 weight %, such as 75 weight % of active ingredient(s), and from about 20 to about 30 weight %, such as 25 weight % of adjuvant(s).

Suitable insecticides, herbicides, fungicides, and nematicides can include the following: Insecticides: A0) various insecticides, including agrigata, al-phosphide, amblyseius, *aphelinus, aphidius, aphidoletes,* artimisinin, *Autographa californica* NPV, azocyclotin, *Bacillus subtilis, Bacillus thuringiensis*—spp. *aizawai, Bacillus thuringiensis* spp. *kurstaki, Bacillus thuringiensis, Beauveria, Beauveria bassiana,* betacyfluthrin, biologicals, bisultap, brofluthrinate, bromophos-e, bromopropylate, Bt-Corn-GM, Bt-Soya-GM, capsaicin, cartap, *celastrus*-extract, chlorantraniliprole, chlorbenzuron, chlorethoxyfos, chlorfluazuron, chlorpyrifos-e, cnidiadin, cryolite, cyanophos, cyantraniliprole, cyclaniliprole, cyhalothrin, cyhexatin, cypermethrin, *dacnusa*, DCIP, dichloropropene, dicofol, *diglyphus, diglyphus+dacnusa,* dimethacarb, dithioether, dodecyl-acetate, emamectin, *encarsia,* EPN, *eretmocerus,* ethylene-dibromide, eucalyptol, fatty-acids, fatty-acids/salts, fenazaquin, fenobucarb (BPMC), fenpyroximate, flubrocythrinate, flufenzine, formetanate, formothion, furathiocarb, gamma-cyhalothrin, garlic-juice, granulosis-virus, *harmonia, heliothis armigera* NPV, inactive bacterium, indol-3-ylbutyric acid, iodomethane, iron, isocarbofos, isofenphos, isofenphos-m, isoprocarb, isothioate, kaolin, lindane, liuyangmycin, matrine, mephosfolan, metaldehyde, metarhizium-anisopliae, methamidophos, metolcarb (MTMC), mineral-oil, mirex, m-isothiocyanate, monosultap, *myrothecium verrucaria,* naled, *neochrysocharis formosa,* nicotine, nicotinoids, oil, oleic acid, omethoate, orius, oxymatrine, *paecilomyces,* paraffin-oil, parathion-e, *pasteuria,* petroleum-oil, pheromones, phosphorus-acid, *photorhabdus,* phoxim, *phytoseiulus,* pirimiphos-e, plant-oil, *Plutella xylostella* GV, polyhedrosis-virus, polyphenol-extracts, potassium-oleate, profenofos, prosuler, prothiofos, pyraclofos, pyrethrins, pyridaphenthion, pyrimidifen, pyriproxifen, quillay-extract, quinomethionate, rape-oil, rotenone, saponin, saponozit, sodium-compounds, sodium-fluosilicate, starch, *steinernema, streptomyces,* sulfluramid, sulphur, tebupirimfos, tefluthrin, temephos, tetradifon, thiofanox, thiometon, transgenics (e.g., Cry3Bb1), triazamate, *trichoderma, trichogramma,* triflumuron, *verticillium,* vertrine, isomeric insecticides (e.g., kappa-bifenthrin, kappa-tefluthrin), dichoromezotiaz, broflanilide, pyraziflumid; A1) the class of carbamates, including aldicarb, alanycarb, benfuracarb, carbaryl, carbofuran, carbosulfan, methiocarb, methomyl, oxamyl, pirimicarb, propoxur and thiodicarb; A2) the class of organophosphates, including acephate, azinphos-ethyl, azinphos-methyl, chlorfenvinphos, chlorpyrifos, chlorpyrifos-methyl, demeton-S-methyl, diazinon, dichlorvos/DDVP, dicrotophos, dimethoate, disulfoton, ethion, fenitrothion, fenthion, isoxathion, malathion, methamidaphos, methidathion, mevinphos, monocrotophos, oxymethoate, oxydemeton-methyl, parathion, parathion-methyl, phenthoate, phorate, phosalone, phosmet, phosphamidon, pirimiphos-methyl, quinalphos, terbufos, tetrachlorvinphos, triazophos and trichlorfon; A3) the class of cyclodiene organochlorine compounds such as endosulfan; A4) the class of fiproles, including ethiprole, fipronil, pyrafluprole and pyriprole; A5) the class of neonicotinoids, including acetamiprid, clothianidin, dinotefuran, imidacloprid, nitenpyram, thiacloprid and thiamethoxam; A6) the class of spinosyns such as spinosad and spinetoram; A7) chloride channel activators from the class of mectins, including abamectin, emamectin benzoate, ivermectin, lepimectin and milbemectin; A8) juvenile hormone mimics such as hydroprene, kinoprene, methoprene, fenoxycarb and pyriproxyfen; A9) selective homopteran feeding blockers such as pymetrozine, flonicamid and pyrifluquinazon; A10) mite growth inhibitors such as clofentezine, hexythiazox and etoxazole; A11) inhibitors of mitochondrial ATP synthase such as diafenthiuron, fenbutatin oxide and propargite; uncouplers of oxidative phosphorylation such as chlorfenapyr; A12) nicotinic acetylcholine receptor channel blockers such as bensultap, cartap hydrochloride, thiocyclam and thiosultap sodium; A13) inhibitors of the chitin biosynthesis type 0 from the benzoylurea class, including bistrifluron, diflubenzuron, flufenoxuron, hexaflumuron, lufenuron, novaluron and teflubenzuron; A14) inhibitors of the chitin biosynthesis type 1 such as buprofezin; A15) molting disruptors such as cyromazine; A16) ecdyson receptor agonists such as methoxyfenozide, tebufenozide, halofenozide and chromafenozide; A17) octopamin receptor agonists such as amitraz; A18) mitochondrial complex electron transport inhibitors pyridaben, tebufenpyrad, tolfenpyrad, flufenerim, cyenopyrafen, cyflumetofen, hydramethylnon, acequinocyl or fluacrypyrim; A19) voltage-dependent sodium channel blockers such as indoxacarb and metaflumizone; A20) inhibitors of the lipid synthesis such as spirodiclofen, spiromesifen and spirotetramat; A21) ryanodine receptor-modulators from the class of diamides, including flubendiamide, the phthalamide compounds (R)-3-Chlor-N1-{2-methyl-4-[1,2,2,2-tetrafluor-1-(trifluormethyl) ethyl]phenyl}-N2-(1-methyl-2-methylsulfonylethyl) phthalamid and (S)-3-Chlor-N1-{2-methyl-4-[1,2,2,2-tetrafluor-1-(trifluormethyl)ethyl]phenyl}-N2-(1-methyl-2- methylsulfonylethyl)phthalamid, chlorantraniliprole, cyclaniliprole and cyantraniliprole; A22) compounds of unknown or uncertain mode of action such as azadirachtin, amidoflumet, bifenazate, fluensulfone, piperonyl butoxide, pyridalyl, sulfoxaflor; or A23) sodium channel modulators from the class of pyrethroids, including acrinathrin, allethrin, bifenthrin, cyfluthrin, lambda-cyhalothrin, cypermethrin, alpha-cypermethrin, beta-cypermethrin, zeta-cypermethrin, deltamethrin, esfenvalerate, etofenprox, fenpropathrin, fenvalerate, flucythrinate, tau-fluvalinate, permethrin, silafluofen and tralomethrin.

Preferred insect control agents comprise chlorantraniliprole, chlorethoxyfos, chlorpyrifos-e, cyantraniliprole, cyclaniliprole, cypermethrin, dichloropropene, flupyradifurone, gamma-cyhalothrin, profenofos, tebupirimfos, tefluthrin, tetraniliprole, kappa-bifenthrin, kappa-tefluthrin, carbofuran, carbosulfan, oxamyl, thiodicarb, chlorpyrifos, chlorpyrifos-e, chlorpyrifos-methyl, diazinon, phorate, terbufos, fipronil, acetamiprid, clothianidin, imidacloprid, thiacloprid, thiamethoxam, abamectin, flonicamid, flubendiamide, bifenthrin, lambda-cyhalothrin, cypermethrin, zeta-cypermethrin, deltamethrin, or any mixtures thereof.

More preferred are clothianidin, thiamethoxam, imidacloprid, tefluthrin, fipronil, chlorpyrifos-e, tebupirimfos, bifenthrin, cypermethrin, zeta-cypermethrin, gamma-cyhalothrin, oxamyl, chlorantraniliprole, cyantraniliprole, cyclaniliprole, tetraniliprole, or mixtures thereof.

Fungicides: B0) benzovindiflupyr, antiperonosporic agents, ametoctradin, amisulbrom, copper salts (e.g., copper hydroxide, copper oxychloride, copper sulfate, copper persulfate), boscalid, thiflumazide, flutianil, furalaxyl, thiabendazole, benodanil, mepronil, isofetamid, fenfuram, bixafen, fluxapyroxad, penflufen, sedaxane, coumoxystrobin, enoxastrobin, flufenoxystrobin, pyraoxystrobin, pyrametostrobin, triclopyricarb, fenaminstrobin, metominostrobin, pyribencarb, meptyldinocap, fentin acetate, fentin chloride, fentin hydroxide, oxytetracycline, chlozolinate, chloroneb, tecnazene, etridiazole, iodocarb, prothiocarb, *Bacillus subtilis* syn., *Bacillus amyloliquefaciens* (e.g., strains QST 713, FZB24, MBI600, D747), extract from *Melaleuca alternifolia*, pyrisoxazole, oxpoconazole, etaconazole, fenpyrazamine, fenpicoxamide, mefentrifluconazole, naftifine, terbinafine, validamycin, pyrimorph, valifenalate, phthalide, probenazole, isotianil, laminarin, extract from *Reynoutria sachalinensis*, phosphorous acid and salts, teclofthalam, triazoxide, pyriofenone, organic oils, potassium bicarbonate, chlorothalonil, fluoroimide; B1) azoles, including bitertanol, bromuconazole, cyproconazole, difenoconazole, diniconazole, enilconazole, epoxiconazole, fluquinconazole, fenbuconazole, flusilazole, flutriafol, hexaconazole, imibenconazole, ipconazole, metconazole, myclobutanil, penconazole, propiconazole, prothioconazole, simeconazole, triadimefon, triadimenol, tebuconazole, tetraconazole, triticonazole, prochloraz, pefurazoate, imazalil, triflumizole, cyazofamid, benomyl, carbendazim, thia-bendazole, fuberidazole, ethaboxam, etridiazole and hymexazole, azaconazole, diniconazole-M, oxpoconazol, paclobutrazol, uniconazol, 1-(4-chloro-phenyl)-2-([1,2,4]triazol-1-yl)-cycloheptanol and imazalilsulfphate; B2) strobilurins, including azoxystrobin, dimoxystrobin, enestroburin, fluoxastrobin, kresoxim-methyl, methominostrobin, orysastrobin, picoxystrobin, pyraclostrobin, trifloxystrobin, enestroburin, methyl (2-chloro-5-[1-(3-methylbenzyloxyimino)ethyl]benzyl)carbamate, methyl (2-chloro-5-[1-(6-methylpyridin-2-ylmethoxyimino)ethyl]carbamate and methyl 2-(ortho-(2,5-dimethylphenyloxymethylene)-phenyl)-3-methoxyacrylate, 2-(2-(6-(3-chloro-2-methyl-phenoxy)-5-fluoro-pyrimidin-4-yloxy)-phenyl)-2-methoxyimino-N-methyl-acetamide and 3-methoxy-2-(2-(N-(4-methoxyphenyl)-cyclopropanecarboximidoylsulfanylmethyl)-phenyl)-acrylic acid methyl ester; B3) carboxamides, including carboxin, benalaxyl, benalaxyl-M, fenhexamid, flutolanil, furametpyr, mepronil, metalaxyl, mefenoxam, ofurace, oxadixyl, oxycarboxin, penthiopyrad, isopyrazam, thifluzamide, tiadinil, 3,4-dichloro-N-(2-cyanophenyl)isothiazole-5-carboxamide, dimethomorph, flumorph, flumetover, fluopicolide (picobenzamid), zoxamide, carpropamid, diclocymet, mandipropamid, N-(2-(4-[3-(4-chlorophenyl)prop-2-ynyloxy]-3-methoxyphenyl)ethyl)-2-methanesulfonyl-amino-3-methylbutyramide, N-(2-(4-[3-(4-chloro-phenyl)prop-2-ynyloxy]-3-methoxy-phenyl) ethyl)-2-ethanesulfonylamino-3-methylbutyramide, methyl 3-(4-chlorophenyl)-3-(2-isopropoxycarbonylamino-3-methyl-butyrylamino)propionate, N-(4'-bromobiphenyl-2-yl)-4-difluoromethyl-2-methylthiazole-5-carboxamide, N-(4'-trifluoromethyl-biphenyl-2-yl)-4-difluoromethyl-2-methylthiazole-5-carboxamide, N-(4'-chloro-3'-fluorobiphenyl-2-yl)-4-difluoromethyl-2-methyl-thiazole-5-carboxamide, N-(3',4'-dichloro-4-fluorobiphenyl-2-yl)-3-difluoromethyl-1-methylpyrazole-4-carboxamide, N-(3',4'-dichloro-5-fluorobiphenyl-2-yl)-3-difluoromethyl-1-methylpyrazole-4-carboxamide, N-(2-cyano-phenyl)-3,4-dichloroisothiazole-5-carboxamide, 2-amino-4-methylthiazole-5-carboxanilide, 2-chloro-N-(1,1,3-trimethylindan-4-yl)-nicotinamide, N-(2-(1,3-dimethylbutyl)-phenyl)-1,3-dimethyl-5-fluoro-1H-pyrazole-4-carboxamide, N-(4'-chloro-3',5-difluoro-biphenyl-2-yl)-3-difluoromethyl-1-methyl-1H-pyrazole-4-carboxamide, N-(4'-chloro-3',5-difluoro-biphenyl-2-yl)-3-trifluoromethyl-1-methyl-1H-pyrazole-4-carboxamide, N-(3',4'-dichloro-5-fluoro-biphenyl-2-yl)-3-trifluoromethyl-1-methyl-1H-pyrazole-4-carboxamide, N-(3',5-difluoro-4'-methyl-biphenyl-2-yl)-3-difluoromethyl-1-methyl-1H-pyrazole-4-carboxamide, N-(3',5-difluoro-4'-methyl-biphenyl-2-yl)-3-trifluoromethyl-1-methyl-1H-pyrazole-4-carboxamide, N-(cis-2-bicyclopropyl-2-yl-phenyl)-3-difluoromethyl-1-methyl-1H-pyrazole-4-carboxamide, N-(trans-2-bicyclopropyl-2-yl-phenyl)-3-difluoro-methyl-1-methyl-1H-pyrazole-4-carboxamide, fluopyram, N-(3-ethyl-3,5-5-trimethyl-cyclohexyl)-3-formylamino-2-hydroxy-benzamide, oxytetracyclin, silthiofam, N-(6-methoxy-pyridin-3-yl) cyclopropanecarboxamide, 2-iodo-N-phenyl-benzamide, N-(2-bicyclo-propyl-2-yl-phenyl)-3-difluormethyl-1-methylpyrazol-4-ylcarboxamide, N-(3',4',5'-trifluorobiphenyl-2-yl)-1,3-dimethylpyrazol-4-ylcarboxamide, N-(3',4',5'-trifluorobiphenyl-2-yl)-1,3-dimethyl-5-fluoropyrazol-4-ylcarboxamide, N-(3',4',5'-trifluorobiphenyl-2-yl)-5-chloro-1,3-dimethylpyrazol-4-ylcarboxamide, N-(3',4',5'-trifluorobiphenyl-2-yl)-3-fluoromethyl-1-methylpyrazol-4-ylcarboxamide, N-(3',4',5'-trifluorobiphenyl-2-yl)-3-(chlorofluoromethyl)-1-methylpyrazol-4-ylcarboxamide, N-(3',4',5'-trifluorobiphenyl-2-yl)-3-difluoromethyl-1-methylpyrazol-4-ylcarboxamide, N-(3',4',5'-trifluorobiphenyl-2-yl)-3-difluoromethyl-5-fluoro-1-methylpyrazol-4-ylcarboxamide, N-(3',4',5'-trifluorobiphenyl-2-yl)-5-chloro-3-difluoromethyl-1-methylpyrazol-4-ylcarboxamide, N-(3',4',5'-trifluorobiphenyl-2-yl)-3-(chlorodifluoromethyl)-1-methylpyrazol-4-ylcarboxamide, N-(3',4',5'-trifluorobiphenyl-2-yl)-1-methyl-3-trifluoromethylpyrazol-4-ylcarboxamide, N-(3',4',5'-trifluorobiphenyl-2-yl)-5-fluoro-1-methyl-3-trifluoromethylpyrazol-4-ylcarboxamide, N-(3',4',5'-trifluorobiphenyl-2-yl)-5-chloro-1-methyl-3-trifluoromethylpyrazol-4-ylcarboxamide, N-(2',4',5'-trifluorobiphenyl-2-yl)-1,3-dimethylpyrazol-4-ylcarboxamide, N-(2',4',5'-trifluorobiphenyl-2-yl)-1,3-dimethyl-5-fluoropyrazol-4-ylcarboxamide, N-(2',4',5'-trifluorobiphenyl-2-yl)-5-chloro-1,3-dimethylpyrazol-4-ylcarboxamide, N-(2',4',5'-trifluorobiphenyl-2-yl)-3-fluoromethyl-1-methylpyrazol-4-ylcarboxamide, N-(2',4',5'-trifluorobiphenyl-2-yl)-3-(chlorofluoromethyl)-1-methylpyrazol-4-ylcarboxamide, N-(2',4',5'-trifluorobiphenyl-2-yl)-3-difluoromethyl-1-methylpyrazol-4-ylcarboxamide, N-(2',4',5'-trifluorobiphenyl-2-yl)-3-difluoromethyl-5-fluoro-1-methylpyrazol-4-ylcarboxamide, N-(2',4',5'-trifluorobiphenyl-2-yl)-5-chloro-3-difluoromethyl-1-methylpyrazol-4-ylcarboxamide, N-(2',4',5'-trifluorobiphenyl-2-yl)-3-(chlorodifluoromethyl)-1-methylpyrazol-4-ylcarboxamide, N-(2',4',5'-trifluorobiphenyl-2-yl)-1-methyl-3-trifluoromethylpyrazol-4-ylcarboxamide, N-(2',4',5'-trifluorobiphenyl-2-yl)-5-fluoro-1-methyl-3-trifluoromethylpyrazol-4-ylcarboxamide, N-(2',4',5'-trifluorobiphenyl-2-yl)-5-chloro-1-methyl-3-trifluoromethylpyrazol-4-ylcarboxamide, N-(3',4'-dichloro-3-fluorobiphenyl-2-yl)-1-methyl-3-trifluoromethyl-1H-pyrazole-4-carboxamide, N-(3',4'-dichloro-3-fluorobiphenyl-2-yl)-1-methyl-3-difluoromethyl-1H-pyrazole-4-carboxamide, N-(3',4'-difluoro-3-fluorobiphenyl-2-yl)-1-methyl-3-trifluoromethyl-1H-pyrazole-4-carboxamide, N-(3',4'-difluoro-3-fluorobiphenyl-2-yl)-1-methyl-S-difluoromethyl-1H-pyrazole-4-carboxamide, N-(3'-chloro-4'-fluoro-3-fluorobiphenyl-2-yl)-1-methyl-3-difluoromethyl-1H-pyrazole-4-carboxamide, N-(3',4'-dichloro-4-fluorobiphenyl-2-yl)-1-methyl-3-trifluoromethyl-1H-pyrazole-4-carboxamide, N-(3',4'-difluoro-4-fluorobiphenyl-2-yl)-1-methyl-5-trifluoromethyl-1H-pyrazole-4-carboxamide, N-(3',4'-dichloro-4-fluorobiphenyl-2-yl)-1-methyl-3-difluoromethyl-1H-pyrazole-4-carboxamide, N-(3',4'-difluoro-4-fluorobiphenyl-2-yl)-1-methyl-3-difluoromethyl-1H-pyrazole-4-carboxamide, N-(3'-chloro-4'-fluoro-4-fluorobiphenyl-2-yl)-1-methyl-S-difluoromethyl-1H-pyrazole-4-carboxamide, N-(3',4'-dichloro-5-fluorobiphenyl-2-yl)-1-methyl-3-trifluoromethyl-1H-pyrazole-4-carboxamide, N-(3',4'-difluoro-5-fluorobiphenyl-2-yl)-1-methyl-3-trifluoromethyl-1H-pyrazole-4-carboxamide, N-(3',4'-dichloro-5-fluorobiphenyl-2-yl)-1-methyl-S-difluoromethyl-1H-pyrazole-carboxamide, N-(3',4'-difluoro-5-fluorobiphenyl-2-yl)-1-methyl-3-difluoromethyl-1H-pyrazole-4-carboxamide, N-(3',4'-dichloro-5-fluorobiphenyl-2-yl)-1,3-dimethyl-1H-pyrazole-4-carboxamide, N-(3'-chloro-4'-fluoro-5-fluorobiphenyl-2-yl)-1-methyl-3-difluoromethyl-1H-pyrazole-4-carboxamide, N-(4'-fluoro-4-fluorobiphenyl-2-yl)-1-methyl-3-trifluoromethyl-1H-pyrazole-4-carboxamide, N-(4'-fluoro-5-fluorobiphenyl-2-yl)-1-methyl-3-trifluoromethyl-1H-pyrazole-4-carboxamide, N-(4'-chloro-5-fluorobiphenyl-2-yl)-1-methyl-3-trifluoromethyl-1H-pyrazole-4-carboxamide, N-(4'-methyl-5-fluorobiphenyl-2-yl)-1-methyl-3-trifluoromethyl-1H-pyrazole-4-carboxamide, N-(4'-fluoro-5-fluorobiphenyl-2-yl)-1,3-dimethyl-1H-pyrazole-4-carboxamide, N-(4'-chloro-5-fluorobiphenyl-2-yl)-1,3-dimethyl-1H-pyrazole-4-carboxamide, N-(4'-methyl-5-fluorobiphenyl-2-yl)-1,3-dimethyl-1H-pyrazole-4-carboxamide, N-(4'-fluoro-6-fluorobiphenyl-2-yl)-1-methyl-3-trifluoromethyl-1H-pyrazole-4-carboxamide, N-(4'-chloro-6-fluorobiphenyl-2-yl)-1-methyl-3-trifluoromethyl-1H-pyrazole-4-carboxamide, N-[2-(1,1,2,3,3,3-hexafluoropropoxy)-phenyl]-3-difluoromethyl-1-methyl-1H-pyrazole-4-carboxamide, N-[4'-(trifluoromethylthio)-biphenyl-2-yl]-3-difluoromethyl-1-methyl-1H-pyrazole-4-carboxamide and N-[4'-(trifluoromethylthio)-biphenyl-2-yl]-1-methyl-3-trifluoromethyl-1-methyl-1H-pyrazole-4-carboxamide; B4) heterocyclic compounds, including fluazinam, pyrifenox, bupirimate, cyprodinil, fenarimol, ferimzone, mepanipyrim, nuarimol, pyrimethanil, triforine, fenpiclonil, fludioxonil, aldimorph, dodemorph, fenpropimorph, tridemorph, fenpropidin, iprodione, procymidone, vinclozolin, famoxadone, fenamidone, octhilinone, probenazole, 5-chloro-7-(4-methyl-piperidin-1-yl)-6-(2,4,6-trifluorophenyl)-[1,2,4]triazolo[1,5-a]pyrimidine, anilazine, diclomezine, pyroquilon, proquinazid, tricyclazole, 2-butoxy-6-iodo-3-propyl-chromen-4-one, acibenzolar-S-methyl, captafol, captan, dazomet, folpet, fenoxanil, quinoxyfen, N,N-dimethyl-3-(3-bromo-6-fluoro-2-methylindole-1-sulfonyl)-[1,2,4]triazole-1-sulfonamide, 5-ethyl-6-octyl-[1,2,4]triazolo[1,5-a]pyrimidin-2,7-diamine, 2,3,5,6-tetrachloro-4-methanesulfonylpyridine, 3,4,5-trichloro-pyridine-2,6-dicarbonitrile, N-(1-(5-bromo-3-chloro-pyridin-2-yl)-ethyl)-2,4-dichloro-nicotinamide, N-((5-bromo-3-chloropyridin-2-yl)-methyl)-2,4-dichloro-nicotinamide, diflumetorim, nitrapyrin, dodemorphacetate, fluoroimid, blasticidin-S, chinomethionat, debacarb, difenzoquat, difenzoquat-methylsulphat, oxolinic acid and piperalin; B5) carbamates, including mancozeb, maneb, metam, methasulphocarb, metiram, ferbam, propineb, thiram, zineb, ziram, diethofencarb, iprovalicarb, benthiavalicarb, propamocarb, propamocarb hydrochlorid, 4-fluorophenyl N-(1-(1-(4-cyanophenyl)-ethanesulfonyl)but-2-yl)carbamate, methyl 3-(4-chloro-phenyl)-3-(2-isopropoxycarbonylamino-3-methyl-butyrylamino)propanoate; or B6) other fungicides, including guanidine, dodine, dodine free base, iminoctadine, guazatine, antibiotics: kasugamycin, oxytetracyclin and its salts, streptomycin, polyoxin, validamycin A, nitrophenyl derivatives: binapacryl, dinocap, dinobuton, sulfur-containing heterocyclyl compounds: dithianon, isoprothiolane, organometallic compounds: fentin salts, organophosphorus compounds: edifenphos, iprobenfos, fosetyl, fosetyl-aluminum, phosphorous acid and its salts, pyrazophos, tolclofos-methyl, organochlorine compounds: dichlofluanid, flusulfamide, hexachloro-benzene, phthalide, pencycuron, quintozene, thiophanate, thiophanate-methyl, tolylfluanid, others: cyflufenamid, cymoxanil, dimethirimol, ethirimol, furalaxyl, metrafenone and spiroxamine, guazatine-acetate, iminoctadine-triacetate, iminoctadine-tris(albesilate), kasugamycin hydrochloride hydrate, dichlorophen, pentachlorophenol and its salts, N-(4-chloro-2-nitro-phenyl)-N-ethyl-4-methyl-benzene sulfonamide, dicloran, nitrothal-isopropyl, tecnazen, biphenyl, bronopol, diphenylamine, mildiomycin, oxincopper, prohexadione calcium, N-(cyclopropylmethoxyimino-(6-difluoromethoxy-2,3-difluoro-phenyl)-methyl)-2-phenyl acetamide, N-(4-(4-chloro-3-trifluoromethyl-phenoxy)-2,5-dimethyl-phenyl)-N-ethyl-N-methyl formamidine, N-(4-(4-fluoro-3-trifluoromethyl-phenoxy)-2,5-dimethyl-phenyl)-N-ethyl-N-methyl formamidine, N-(2-methyl-5-trifluormethyl-4-(3-trimethylsilanyl-propoxy)-phenyl)-N-ethyl-N-methylformamidine and N-(5-difluormethyl-2-methyl-4-(3-trimethylsilanyl-propoxy)-phenyl)-N-ethyl-N-methyl formamidine.

Preferred fungal control agents comprise thiabendazole, fluxapyroxad, penflufen, sedaxane, bitertanol, cyproconazole, difenoconazole, fluquinconazole, flutriafol, ipconazole, myclobutanil, prothioconazole, triadimefon, triadimenol, tebuconazole, triticonazole, prochloraz, imazalil, benomyl, carbendazim, hymexazole, azoxystrobin, fluoxastrobin, pyraclostrobin, trifloxystrobin, carboxin, flutolanil, metalaxyl, mefenoxam, penthiopyrad, fluopyram, silthiofam, fluazinam, pyrimethanil, fludioxonil, iprodione, tricyclazole, captan, dazomet, mancozeb, metam, thiram, guazatine, tolclofos-methyl, pencycuron, thiophanate-methyl, fenpicoxamide, mefentrifluconazole, or any mixtures thereof.

More preferred are fludioxonil, prothioconazole, mefenoxam, metalaxyl, tebuconazole, difenoconazole, thiram, carboxin, carbendazim, triticonazole, pencycuron, imazalil, pyraclostrobin, sedaxane, trifloxystrobin, fluquinconazole, fluoxastrobin, azoxystrobin, flutriafol, fluxapyroxad, penthiopyrad, fenpicoxamide, mefentrifluconazole, or mixtures thereof.

Herbicides: C1) acetyl-CoA carboxylase inhibitors (ACC), for example cyclohexenone oxime ethers, such as alloxydim, clethodim, cloproxydim, cycloxydim, sethoxydim, tralkoxydim, butroxydim, clefoxydim or tepraloxydim; phenoxyphenoxypropionic esters, such as clodinafop-propargyl, cyhalofop-butyl, diclofop-methyl, fenoxaprop-ethyl, fenoxaprop-P-ethyl, fenthiapropethyl, fluazifop-butyl, fluazifop-P-butyl, haloxyfop-ethoxyethyl, haloxyfop-methyl, haloxyfop-P-methyl, isoxapyrifop, propaquizafop, quizalofop-ethyl, quizalofop-P-ethyl or quizalofop-tefuryl; or arylaminopropionic acids, such as flamprop-methyl or flamprop-isopropyl; C2 acetolactate synthase inhibitors (ALS), for example imidazolinones, such as imazapyr, imazaquin, imazamethabenz-methyl (imazame), imazamox, imazapic or imazethapyr; pyrimidyl ethers, such as pyrithiobac-acid, pyrithiobac-sodium, bispyribac-sodium, KIH-6127 or pyribenzoxym; sulfonamides, such as florasulam, flumetsulam or metosulam; or sulfonylureas, such as amidosulfuron, azimsulfuron, bensulfuronmethyl, chlorimuron-ethyl, chlorsulfuron, cinosulfuron, cyclosulfamuron, ethametsulfuron-methyl, ethoxysulfuron, flazasulfuron, halosulfuron-methyl, imazosulfuron, metsulfuron-methyl, nicosulfuron, primisulfuron-methyl, prosulfuron, pyrazosulfuron-ethyl, rimsulfuron, sulfometuronmethyl, thifensulfuron-methyl, triasulfuron, tribenuronmethyl, triflusulfuron-methyl, tritosulfuron, sulfosulfuron, foramsulfuron or iodosulfuron; C3) amides, for example allidochlor (CDAA), benzoylprop-ethyl, bromobutide, chiorthiamid. diphenamid, etobenzanidibenzchlomet), fluthiamide, fosamin or monalide; C4) auxin herbicides, for example pyridinecarboxylic acids, such as clopyralid or picloram; or 2,4-D or benazolin; C5) auxin transport inhibitors, for example naptalame or diflufenzopyr; C6) carotenoid biosynthesis inhibitors, for example benzofenap, clomazone (dimethazone), diflufenican, fluorochloridone, fluridone, pyrazolynate, pyrazoxyfen, isoxaflutole, isoxachlortole, mesotrione, sulcotrione (chlormesulone), ketospiradox, flurtamone, norflurazon or amitrol; C7) enolpyruvylshikimate-3-phosphate synthase inhibitors (EPSPS), for example glyphosate or sulfosate; C8) glutamine synthetase inhibitors, for example bilanafos (bialaphos) or glufosinate-ammonium; C9) lipid biosynthesis inhibitors, for example anilides, such as anilofos or mefenacet; chloroacetanilides, such as dimethenamid, S-dimethenamid, acetochlor, alachlor, butachlor, butenachlor, diethatyl-ethyl, dimethachlor, metazachlor, metolachlor, S-metolachlor, pretilachlor, propachlor, prynachlor, terbuchlor, thenylchlor or xylachlor; thioureas, such as butylate, cycloate, di-allate, dimepiperate, EPTC, esprocarb, molinate, pebulate, prosulfocarb, thiobencarb (benthiocarb), triallate or vemolate; or benfuresate or perfluidone; C10) mitosis inhibitors, for example carbamates, such as asulam, carbetamid, chlorpropham, orbencarb, pronamid (propyzamid), propham or tiocarbazil; dinitroanilines, such as benefin, butralin, dinitramin, ethalfluralin, fluchloralin, oryzalin, pendimethalin, prodiamine or trifluralin; pyridines, such as dithiopyr or thiazopyr; or butamifos, chlorthal-dimethyl (DCPA) or maleic hydrazide; C11) protoporphyrinogen IX oxidase inhibitors, for example diphenyl ethers, such as acifluorfen, acifluorfen-sodium, aclonifen, bifenox, chlomitrofen (CNP), ethoxyfen, fluorodifen, fluoroglycofenethyl, fomesafen, furyloxyfen, lactofen, nitrofen, nitrofluorfen or oxyfluorfen; oxadiazoles, such as oxadiargyl or oxadiazon; cyclic imides, such as azafenidin, butafenacil, carfentrazone-ethyl, cinidon-ethyl, flumiclorac-pentyl, flumioxazin, flumipropyn, flupropacil, fluthiacet-methyl, sulfentrazone or thidiazimin; or pyrazoles, such as ET-751.JV 485 or nipyraclofen; C12) photosynthesis inhibitors, for example propanil, pyridate or pyridafol; benzothiadiazinones, such as bentazone; dinitrophenols, for example bromofenoxim, dinoseb, dinoseb-acetate, dinoterb or DNOC; dipyridylenes, such as cyperquat-chloride, difenzoquat-methylsulfate, diquat or paraquat-dichloride; ureas, such as chlorbromuron, chlorotoluron, difenoxuron, dimefuron, diuron, ethidimuron, fenuron, fluometuron, isoproturon, isouron, linuron, methabenzthiazuron, methazole, metobenzuron, metoxuron, monolinuron, neburon, siduron or tebuthiuron; phenols, such as bromoxynil or ioxynil; chloridazon; triazines, such as ametryn, atrazine, cyanazine, desmein, dimethamethryn, hexazinone, prometon, prometryn, propazine, simazine, simetryn, terbumeton, terbutryn, terbutylazine or trietazine; triazinones, such as metamitron or metribuzin; uracils, such as bromacil, lenacil or terbacil; or biscarbamates, such as desmedipham or phenmedipham; C13) synergists, for example oxiranes, such as tridiphane; C14) CIS cell wall synthesis inhibitors, for example isoxaben or dichlobenil; C15) various other herbicides, for example dichloropropionic acids, such as dalapon; dihydrobenzofurans, such as ethofumesate; phenylacetic acids, such as chlorfenac (fenac); or aziprotryn, barban, bensulide, benzthiazuron, benzofluor, buminafos, buthidazole, buturon, cafenstrole, chlorbufam, chlorfenprop-methyl, chloroxuron, cinmethylin, cumyluron, cycluron, cyprazine, cyprazole, dibenzyluron, dipropetryn, dymron, eglinazin-ethyl, endothall, ethiozin, flucabazone, fluorbentranil, flupoxam, isocarbamid, isopropalin, karbutilate, mefluidide, monuron, napropamide, napropanilide, nitralin, oxaciclomefone, phenisopham, piperophos, procyazine, profluralin, pyributicarb, secbumeton, sulfallate (CDEC), terbucarb, triaziflam, triazofenamid or trimeturon; or their environmentally compatible salts.

Nematicides or bionematicides: benomyl, cloethocarb, aldoxycarb, tirpate, diamidafos, fenamiphos, cadusafos, dichlofenthion, ethoprophos, fensulfothion, fosthiazate, heterophos, isamidofof, isazofos, phosphocarb, oxamyl, thionazin, imicyafos, mecarphon, acetoprole, benclothiaz, chloropicrin, dammet, fluensulfone, metam sodium, metam potassium, metam salt (all MITC generators), fluazaindolizine (DPX-Q8U80), tioxazafen.

Preferred nematode control agents comprise benomyl, fenamiphos, cadusafos, ethoprophos, fosthiazate, chloropicrin, dazomet, fluensulfone, oxamyl, metam sodium, metam potassium, metam salt (all MITC generators), fluazaindolizine (DPX-Q8U80), tioxazafen, or any mixtures thereof.

More preferred are cadusafos, ethoprophos, fosthiazate, fluensulfone, oxamyl, fluazaindolizine (DPX-Q8U80), tioxazafen, or any mixtures thereof.

Adjuvants that may be included in the concentrated ingredient include carriers, surface active agents, viscosity modifiers, thickeners, preservatives, biocides or biostatic agents, suspending agents, crystallization inhibitors, colorants, dyes, anti-oxidants, foaming agents, foam stabilizers, light absorbers, mixing auxiliaries, antifoams, complexing agents, neutralizing or pH-modifying substances and buffers, corrosion inhibitors, fragrances, wetting agents, take-up enhancers, micronutrients, plasticizers, glidants, lubricants, dispersants, or any combination thereof.

A solid carrier may be selected from the group consisting of carbohydrates including mono or di carbohydrates such as sucrose, oligo or poly-saccharides such as maltodextrin or pectin, talc, titanium dioxide, pyrophyllite clay, attapulgite clay, kieselguhr, silica (silicon dioxide), limestone, bentonite, calcium montmorillonite, water soluble salts such as sodium, potassium, magnesium, calcium or ammonium salts of acetate, carbonate, chloride, citrate, phosphate, or sulfate such as calcium carbonate, cottonseed husks, wheat flour, soybean flour, pumice, wood flour, ground nut shells, lignin and similar substances, yeast extracts, fish meal, or mixtures thereof.

The compositions may contain a surface-active substance (surfactants, dispersants and emulsifiers) from a very large variety of substances known in the art that are also commercially available. Surface-active substances (described herein generally as surfactants) may be anionic, cationic, non-ionic or polymeric and they can be used as surfactants, dispersants, emulsifiers, wetting agents or suspending agents or for other purposes.

Surfactants belong to different classes such as cationic surfactants, anionic surfactants, non-ionic surfactants, ionic surfactants, and amphoteric surfactants. The surfactant can be any surfactant or combination of two or more surfactants useful to disperse the active ingredients in the liquid medium to provide a final formulation for dispensing as an application to a seed, plant, plant part, soil or furrow.

Examples of some preferred surfactants include cationic, non-ionic, anionic and/or amphoteric surfactants.

Non-ionic surfactants suitable for this invention include ethoxylated linear alcohols, ethoxylated alkyl phenol, alkyl EO/PO copolymer, polyalkylene glycol monobutyl ether ethoxylated fatty acids/oils, sorbitan laurate, polysorbate, sorbitan oleate, ethoxylated fatty acid alcohols, or alkyl phenols, alkanolamides or alkyloamides (such as diethanolamide, lauric acid monoisopropanolamide, and ethoxylated myristamide), xyethylene fatty acid esters, polyoxyethylene fatty alcohol ethers (such as alkylaryl polyglycol ethers), alkylphenol/alkylene oxide addition products, such as nonylphenol ethoxylate; alcohol/alkylene oxide addition products, such as tridecylalcohol ethoxylate.

Anionic surfactants include alkyl-, alkylaryl- and arylsulfonates or salts thereof (such as sodium, potassium or calcium salts of lauryl sarcosinate, alkylbenzenesulfonate, dodecylbenzenesulfonate, alkylnaphthalenesulfonates such as dibutylnaphthalenesulfonate, or $C_{14-16}$ olefin sulfonates), alkyl-, alkylaryl- and arylsulfates or salts thereof (such as sodium, potassium or calcium salts of trideeth sulfate, lauryl sulfate, decyl sulfate, and diethanolammonium lauryl sulfate) protein hydrolysates, derivatives of polycarboxylic acid (such as ammonium lauryl ether carboxylate), olefin sulfonates (such as sodium alpha olefin sulfonate), sarcosinates (such as ammonium cyclohexyl palmitoyl taurinate), succinates (such as disodium N-octadecyl sulfosuccinamate), phosphorus derivatives (such as phosphoric acid esters and their equivalent salts).

Cationic surfactants include alkylbenzyltrimethylammonium chloride, ammonium lauryl sulfate and lauramine oxide.

Other surface active substances include soaps, such as sodium stearate; dialkyl esters of sulfosuccinate salts, such as sodium di(2-ethylhexyl)sulfosuccinate; sorbitol esters, such as sorbitol oleate; quaternary amines, such as laurylt-rimethylammonium chloride, polyethylene glycol esters of fatty acids, such as polyethylene glycol stearate; block copolymers of ethylene oxide and propylene oxide; and salts of mono- and di-alkylphosphate esters.

Also suitable are silicone surfactants, especially polyalkyl-oxide-modified heptamethyltriloxanes which are commercially available e.g. as Silwet L-77®, and also perfluorinated surfactants.

Of these, some even more specific types of preferred surfactants include non-ionic linear or branched alcohol ethoxylate surfactants, anionic phosphoric acid ester surfactants (sometimes referred to as "phosphate ester" surfactants), and cationic ethoxylated tallow amine surfactants.

In another aspect, the composition may contain a thickener. Suitable thickeners include rice, starch, gum arabic, gum tragacanth, guar flour, British gum, starch ethers and starch esters, gum resins, galactomannans, magnesium aluminum silicate, xanthan gum, carrageenan, cellulose derivatives, methyl cellulose, carboxymethylcellulose, alginates and combinations thereof. Other known commercial products may include Lattice NTC 50, Lattice NTC 60, methocel, clay, and veegum silica.

Suitable preservatives include but are not limited to $C_{12}$ to $C_{15}$ alkyl benzoates, alkyl p-hydroxybenzoates, aloe vera extract, ascorbic acid, benzalkonium chloride, benzoic acid, benzoic acid esters of $C_9$ to $C_{15}$ alcohols, butylated hydroxytoluene, butylated hydroxyanisole, tert-butylhydroquinone, castor oil, cetyl alcohols, chlorocresol, citric acid, cocoa butter, coconut oil, diazolidinyl urea, diisopropyl adipate, dimethyl polysiloxane, DMDM hydantoin, ethanol, ethylenediaminetetraacetic acid, fatty acids, fatty alcohols, hexadecyl alcohol, hydroxybenzoate esters, iodopropynyl butylcarbamate, isononyl iso-nonanoate, jojoba oil, lanolin oil, mineral oil, oleic acid, olive oil, parabens, polyethers, polyoxypropylene butyl ether, polyoxypropylene cetyl ether, potassium sorbate, propyl gallate, silicone oils, sodium propionate, sodium benzoate, sodium bisulfite, sorbic acid, stearic fatty acid, sulfur dioxide, vitamin E, vitamin E acetate and derivatives, esters, salts and mixtures thereof. Preferred preservatives include sodium o-phenylphenate, 5-chloro-2-methyl-4-isothiazolin-3-one, 2-methyl-4-isothiazolin-3-one, and 1,2-benisothiazolin-3-one.

Antifoam agents such as Xiameter AFE-100, Dow Corning AFs, Dow Corning 1520, 1530, or 1540 may also be used in the formulations.

Using the dispersion system described herein, the (dry) concentrated ingredient is dispersed in, or mixed with, a liquid medium or carrier for dispensing or delivering a final formulation to a seed, plant, plant part, soil or furrow.

Liquid carriers include solvents and co-solvents including water, petroleum ether, vegetable oils, acid anhydrides, amyl acetate, butylene carbonate, cyclohexane, cyclohexanol, diacetone alcohol, 1,2-dichloropropane, diethanolamine, diethylene glycol, diethylene glycol abietate, diethylene glycol butyl ether, diethylene glycol ethyl ether, diethylene glycol methyl ether, 1,4-dioxane, dipropylene glycol, dipropylene glycol methyl ether, dipropylene glycol dibenzoate, diproxitol, alkylpyrrolidone, 2-ethylhexanol, ethylene carbonate, 1,1,1-trichloroethane, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isobornyl acetate, isooctane, isophorone, isopropyl myristate, lactic acid, laurylamine, mesityl oxide, methoxypropanol, methyl laurate, methyl octanoate, methyl oleate, methylene chloride, n-hexane, n-octylamine, octadecanoic acid, octylamine acetate, oleic acid, oleylamine, polyethylene glycol (PEG), propionic acid, propyl lactate, propylene carbonate, propylene glycol, propylene glycol methyl ether, triethyl phosphate, triethylene glycol, xylenesulfonic acid, paraffin, mineral oil, trichloroethylene, perchloroethylene, alcohols of higher molecular weight, such as amyl alcohol, tetrahydrofurfuryl alcohol, hexanol, octanol, liquid amides such as N,N-dimethyloctanamide, N,N-dimethyldecanamide, N-methyl-N-(2-propylheptyl)-acetamide, N-methyl-N-(2-propylheptyl)-formamide, N-methyl-2-pyrrolidone and the like, or any mixtures thereof.

Notably, the liquid medium is water, optionally further comprising an additional liquid component such as a solvent, co-solvent, surfactant, emulsifier, dispersant, or any combination thereof.

A notable application for which the dispersion system described herein is for mixing a concentrated ingredient with a liquid carrier to provide a foamable formulation or composition suitable for preparing a foam for application to a seed or in-furrow at the time of planting.

Such foamable formulations comprise a foaming agent. Suitable foaming agents may be nonionic surfactants including alkanolamides or alkyloamides (such as diethanolamide lauric acid monoisopropanolamide and ethoxylated myristamide), xyethylene fatty acid esters, polyoxyethylene fatty alcohol ethers (such as alkylaryl polyglycol ethers), anionic surfactants including alkyl-alkylaryl- and arylsulfonates (such as sodium lauryl sarcosinate and such as sodium alkylbenzenesulfonate), alkyl-alkylaryl and arylsulfates (such as sodium decyl sulfate, sodium lauryl sulfate), protein hydrolysates, derivatives of polycarboxylic acid (such as ammonium lauryl ether), carboxylate olefin sulfonates (such as sodium alpha olefin sulfonate) sarcosinates (such as ammonium cyclohexyl palmitoyl taurinate), succinates (such as disodium N-octadecyl sulfosuccinamate), phosphorus derivatives (such as phosphoric acid esters and their equivalent salts), cationic surfactants including alkylbenzyltrimethylammonium chloride and amphoteric surfactants. Particularly preferred foaming agents are sodium dodecylbenzene sulfonate (ex. Bio-Soft® D-40), sodium $C_{14}$-$C_{16}$ olefin sulfonate (ex. Bioterge® AS-40), lauramine oxide (ex. Ammonyx® DO, Ammonyx® LO), ammonium lauryl sulfate (ex. Steol® CA-330), sodium tridedeth sulfate (Cedepal® TD-407) and alkyl sulfates (ex. Polystep® B-25).

Suitable foam stabilizers act to stabilize the foam generated from the liquid, foamable formulation. Examples of suitable foam stabilizers include glycerine, Kelzan, carrageenan, xanthan gum, guar gum, gum Arabic, gum tragacanth, polyox, alginin, and sodium alginate. Glycerine and Kelzan are particularly preferred.

The foamable formulations may also include dispersants, and/or preservatives. Suitable dispersants include nonionic and/or ionic substances, for example from the classes of the alcohol-POE and/or -POP ethers, acid and/or POP POE esters, alkylaryl and/or POP POE ethers, fat and/or POP POE adducts, POE- and/or POP-polyol derivatives, POE- and/or POP-sorbitan or -sugar adducts, alkyl or aryl sulfates, alkyl- or arylsulfonates and alkyl or aryl phosphates or the corresponding PO-ether adducts, and mixtures thereof. Alkyl polyglucosides and phosphate esters are preferred dispersants.

Depending on their properties, the foaming agents and/or foam stabilizers may be included in either the concentrated ingredient or the liquid medium prior to mixing in the system described herein.

The foamable composition prepared in the dispersion system described herein is conducted to the dispensing equipment 48, which comprises a foaming apparatus for use with the foamable formulation. The foaming apparatus comprises a foam generation chamber, in which the foamable composition is mixed with a gas, preferably air, in a dynamic system. Suitable foaming apparatus are described in greater detail in U.S. patent application Ser. No. 14/502,251.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

The invention claimed is:

1. A concentrated chemical dispersion system comprising:
an ingredient container defining an internal chamber and having a predetermined volume of a dry ingredient therein, said container being sealingly closed to seal said predetermined volume of dry ingredient therein, said ingredient container being separable from the system to be storable and transportable separately therefrom, and coupleable sealingly to the system to be in sealed fluid communication therewith when transferring said ingredient to said system;
a fluid container for storing a fluid medium within to be used for mixing with said predetermined volume of a dry ingredient, said fluid container configured to hold a desired amount of the fluid medium sufficient for mixing with said predetermined volume of the dry ingredient for forming a liquid formulation;
a mixing chamber for mixing said predetermined volume of dry ingredient and said fluid medium therein, said mixing chamber configured to be in fluid communication with said fluid container for receiving said fluid medium therefrom at least when said ingredient container is coupled to said system, said mixing chamber configured to contain therein all of said predetermined volume of dry ingredient and said desired amount of the fluid medium at least when said ingredient container is coupled to said system;
an agitator disposed for mixing said predetermined volume of dry ingredient and said fluid medium in said mixing chamber into said liquid formulation; and
a downstream fluid conduit in fluid communication with dispensing equipment for dispensing said liquid formulation after all of said predetermined volume of dry ingredient and said desired amount of said fluid medium are mixed to form said liquid formulation, said mixing chamber being in fluid communication with said downstream fluid conduit at least when said ingredient container is coupled to said system for transferring said liquid formulation to said dispensing equipment, wherein said dispensing equipment is configured to be transportable around an agricultural field for dispensing said liquid formulation at the intended location for the dispersion.

2. The concentrated chemical dispersion system according to claim 1 wherein said ingredient container includes said mixing chamber.

3. The concentrated chemical dispersion system according to claim 1 wherein said internal chamber includes said mixing chamber, and said ingredient container has a container volume greater than said predetermined ingredient volume so as to be capable of receiving and mixing therein a desired amount of fluid medium for forming said formulation.

4. The concentrated chemical dispersion system according to claim 3, wherein said ingredient container includes an outlet having a fitting sealingly coupleable to said downstream fluid conduit and though which said mixed formulation flows to said dispersion equipment when said ingredient container is coupled to said system.

5. The concentrated chemical dispersion system according to claim 1 wherein said agitator is positioned externally of said fluid container and is configured to contact said fluid container for mixing the ingredient and fluid medium therein.

6. The concentrated chemical dispersion system according to claim 1 wherein said mixing chamber is separate from said internal chamber.

7. The concentrated chemical dispersion system according to claim 6 wherein said mixing chamber comprises a separate container independent from said ingredient container.

8. The concentrated chemical dispersion system according to claim 7, wherein said ingredient container includes an outlet having a fitting sealingly coupleable to said system and though which said ingredient flow to said mixing chamber.

9. The concentrated chemical dispersion system according to claim 1 wherein said ingredient container comprises a flexible container.

10. The concentrated chemical dispersion system according to claim 1 wherein said agitator comprises a vibratory device.

11. The concentrated chemical dispersion system according to claim 1 wherein said mixer comprises a mechanical mixer.

12. The concentrated chemical dispersion system according to claim 1 wherein said mixer is configured to mix said ingredient and fluid by deforming said ingredient container.

13. The concentrated chemical dispersion system according to claim 1 further comprising:
a second ingredient container containing a second dry ingredient;
a second mixing chamber for mixing said second ingredient with said fluid medium for forming a second liquid formulation, said second mixing chamber configured to be in fluid communication with said fluid container for receiving said fluid medium therefrom at least when said second ingredient container is coupled to said system; and
said second mixing chamber configured to be in fluid communication with said dispensing equipment at least when said second ingredient container is coupled to said system for delivering said second liquid formulation to said dispensing equipment.

14. The concentrated chemical dispersion system according to claim 13 further comprising a second downstream conduit in fluid communication with said dispensing equipment for dispensing said liquid formulation, said second mixing chamber being in fluid communication with said second downstream fluid conduit at least when said second ingredient container is coupled to said system for transferring said liquid formulation to said dispensing equipment.

15. The concentrated chemical dispersion system according to claim 1 wherein said ingredient container includes at least one fitting capable of creating a sealed fluid connection for fluid communication with said system.

16. The concentrated chemical dispersion system according to claim 1, wherein said ingredient container includes an outlet having a fitting through which said container is sealingly coupleable to said system and though which said ingredient flows to said system.

17. The concentrated chemical dispersion system according to claim 1, wherein said ingredient container includes an inlet having a fitting sealingly coupleable to said system and though which said fluid medium flows into said container.

18. The concentrated chemical dispersion system according to claim 1 wherein said dry ingredient comprises an agricultural agent.

19. The concentrated chemical dispersion system according to claim 1 wherein said dispersion system is configured to be transportable around the agricultural field for dispensing said liquid formulation at the intended location for the dispersion thereof.

20. A concentrated chemical dispersion system comprising:
an ingredient container having an internal chamber comprising a predetermined volume of a dry ingredient therein, said container being sealed closed to seal said predetermined volume of ingredient therein, said ingredient container being separate from the system to be storable and transportable separately therefrom, and having a closed outlet coupleable sealingly to the system to be in sealed fluid communication therewith and which outlet is openable to permit transfer of said ingredient to said system;
a fluid container for storing a fluid medium within to be used for mixing with said predetermined volume of a dry ingredient, said fluid container configured to hold a desired amount of the fluid medium sufficient for mixing with said predetermined volume of the dry ingredient for forming a liquid formulation;
a mixing chamber for mixing said predetermined volume of dry ingredient and said fluid medium therein, said mixing chamber configured to be in fluid communication with said fluid container for receiving said fluid medium therefrom at least when said ingredient container is coupled to said system, said mixing chamber configured to contain therein all of said predetermined volume of dry ingredient and said desired amount of the fluid medium at least when said ingredient container is coupled to said system;
an agitator disposed in said system for mixing said predetermined volume of dry ingredient and said fluid medium in said mixing chamber into said liquid formulation; and
a downstream fluid conduit in fluid communication with dispensing equipment capable of dispensing said liquid formulation a downstream fluid conduit in fluid communication with dispensing equipment for dispensing said liquid formulation after all of said predetermined volume of dry ingredient and said desired amount of said fluid medium are mixed to form said liquid formulation, said mixing chamber being in fluid communication with said downstream fluid conduit at least when said ingredient container is coupled to said system for transferring said liquid formulation to said dispensing equipment, wherein said dispensing equipment is configured to be transportable around an agricultural field for dispensing said liquid formulation at the intended location for the dispersion.

21. The concentrated chemical dispersion system according to claim 20 wherein said internal chamber of said container includes said mixing chamber, and said ingredient container has a container volume greater than the predetermined volume of dry ingredient to be capable of receiving the fluid medium.

22. The concentrated chemical dispersion system according to claim 20 wherein said mixing chamber comprises a container separate from said ingredient container.

23. The concentrated chemical dispersion system according to claim 20 wherein said dispersion system is configured to be transportable around the agricultural field for dispensing said liquid formulation at the intended location for the dispersion thereof.

24. The concentrated chemical dispersion system according to claim 23 wherein said dry ingredient comprises an agricultural agent.

25. The concentrated chemical dispersion system according to claim 24 wherein said dry ingredient comprises an adjuvant.

26. The concentrated chemical dispersion system according to claim 20 wherein said dispensing equipment comprises a foaming apparatus for creating a foam of said liquid formulation.

* * * * *